United States Patent
Ikeda

(10) Patent No.: US 8,285,168 B2
(45) Date of Patent: Oct. 9, 2012

(54) IMAGE FORMING APPARATUS

(75) Inventor: Takemasa Ikeda, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 232 days.

(21) Appl. No.: 12/862,147

(22) Filed: Aug. 24, 2010

(65) Prior Publication Data

US 2011/0052240 A1 Mar. 3, 2011

(30) Foreign Application Priority Data

Aug. 31, 2009 (JP) ................................. 2009-200405

(51) Int. Cl.
*G03G 15/00* (2006.01)
(52) U.S. Cl. ................................. 399/81; 399/82; 399/87
(58) Field of Classification Search ..................... 399/81, 399/82, 83, 85, 87
See application file for complete search history.

(56) References Cited

U.S. PATENT DOCUMENTS

| 6,421,509 B1 * | 7/2002 | Nomura et al. | 399/81 |
| 7,499,661 B2 * | 3/2009 | Ikeda | 399/87 |

FOREIGN PATENT DOCUMENTS

JP 2004-348713 12/2004

* cited by examiner

*Primary Examiner* — Hoang Ngo
(74) *Attorney, Agent, or Firm* — Finnegan, Henderson, Farabow, Garrett & Dunner, L.L.P.

(57) ABSTRACT

An image forming apparatus including plural sheet-feeding trays, and a control section that displays a schedule image to show an execution schedule of a job on a display section, wherein the control section displays a job execution schedule displaying column, and an un-executable job displaying column, both columns being included in the schedule image, wherein when a job represents a tray specifying job that specifies a sheet-feeding tray to be used among the plural sheet-feeding trays, and if the job is un-executable using the sheet-feeding tray specified by the job, the control section controls the un-executable job displaying column, not to display that the specified job is un-executable, even though the specified job is un-executable, and the control section further controls the job execution schedule displaying column to show that the job is not executable, while corresponding the job with the sheet-feeding tray specified by the job.

16 Claims, 15 Drawing Sheets

FIG. 5a

| TRAY | PROFILE NO. | SIZE | SHEET TYPE | SHEET NAME | BASIS WEIGHT | COLOR | PUNCHED HOLE |
|---|---|---|---|---|---|---|---|
| 1 | NOT SPECIFIED | A3 | PLAIN PAPER | PLAIN PAPER | 64-74 g/m$^2$ | WHITE | NONE |
| 2 | NOT SPECIFIED | 9x11 | PLAIN PAPER | PLAIN PAPER | 64-74 g/m$^2$ | WHITE | NONE |
| 3 | NOT SPECIFIED | SRA3 | PLAIN PAPER | PLAIN PAPER | 64-74 g/m$^2$ | WHITE | NONE |
| 4 | NOT SPECIFIED | SRA3 | PLAIN PAPER | PLAIN PAPER | 64-74 g/m$^2$ | WHITE | NONE |
| 5 | NOT SPECIFIED | SRA3 | PLAIN PAPER | PLAIN PAPER | 64-74 g/m$^2$ | WHITE | NONE |
| 6 | NOT SPECIFIED | SRA3 | PLAIN PAPER | PLAIN PAPER | 64-74 g/m$^2$ | WHITE | NONE |
| 7 | NOT SPECIFIED | SRA3 | PLAIN PAPER | PLAIN PAPER | 64-74 g/m$^2$ | WHITE | NONE |
| 8 | NOT SPECIFIED | A3 | FINE-QUALITY PAPER | FINE-QUALITY PAPER | 257-300 g/m$^2$ | WHITE | NONE |
| 9 | NOT SPECIFIED | SRA3 | PLAIN PAPER | PLAIN PAPER | 64-74 g/m$^2$ | WHITE | NONE |

FIG. 5b

| JOB | TRAY | PROFILE NO. | SIZE | SHEET TYPE | SHEET NAME | BASIS WEIGHT | COLOR | PUNCHED HOLE | NUMBER OF DOCUMENT |
|---|---|---|---|---|---|---|---|---|---|
| 1 | 1 | NOT SPECIFIED | A3 | PLAIN PAPER | PLAIN PAPER | 64-74 g/m$^2$ | WHITE | NONE | 100 SHEETS |
| 2 | 3 | NOT SPECIFIED | SRA3 | PLAIN PAPER | PLAIN PAPER | 64-74 g/m$^2$ | WHITE | NONE | 350 SHEETS |
| 3 | 1 | NOT SPECIFIED | A3 | FINE-QUALITY PAPER | FINE-QUALITY PAPER | 257-300 g/m$^2$ | WHITE | NONE | 400 SHEETS |

| JOB | TRAY | PROFILE NO. | SIZE | SHEET TYPE | SHEET NAME | BASIS WEIGHT | COLOR | PUNCHED HOLE | NUMBER OF DOCUMENTS |
|---|---|---|---|---|---|---|---|---|---|
| 1 | 1 | NOT SPECIFIED | A3 | PLAIN PAPER | PLAIN PAPER | 64-74 g/m² | WHITE | NONE | 100 SHEETS |
| 2 | 3 | NOT SPECIFIED | SRA3 | PLAIN PAPER | PLAIN PAPER | 64-74 g/m² | WHITE | NONE | 350 SHEETS |
| 3 | AUTO | NOT SPECIFIED | A3 | FINE-QUALITY PAPER | FINE-QUALITY PAPER | 257-300 g/m² | WHITE | NONE | 400 SHEETS |

IMAGE FORMING APPARATUS

CROSS REFERENCE TO RELATED APPLICATION

This application is based on Japanese Patent Application No. 2009-200,405 filed on Aug. 31, 2009 with the Japanese Patent Office, the entire content of which is hereby incorporated by reference.

TECHNICAL FIELD

The present invention relates to an image forming apparatus.

BACKGROUND ART

In recent years, image forming apparatuses have been disclosed which were configured to display schedule images to show the schedules of jobs to be executed by said apparatuses (see Unexamined Japanese Patent Application Publication Number 2004-348,713). According to said apparatus, information for the types of sheet is displayed on the vertical axis, while information for working times and the number of sheets to be used are displayed on the horizontal axis, so that the schedule of the jobs to be executed are displayed.

Normally, various image forming apparatuses make it possible to receive a tray specifying job to manually specify a sheet-feeding tray as a source tray, as well as to receive an automatic selection job, to automatically determine a sheet-feeding tray as the source tray. Concerning the tray specifying job, the operator specifies a sheet-feeding tray which the operator wants to use. For example, the operator specifies the sheet-feeding tray, in such a case for example, that the operator wants to print personal names on diploma sheets, carrying a blank portion for the personal name, accommodated on the sheet-feeding tray, or in case that the operator wants to print images on the back and front surfaces of the sheets, accommodated on a sheet-feeding tray whose back and front surfaces adjustment value have been adequately controlled.

However, in the conventional image forming apparatuses, when the tray specifying job is executed, the productivity rate may deteriorate. That is, if a specified sheet-feeding tray is empty, or if the contents of sheets, accommodated on the specified tray, are not equal to the contents of sheet ordered by the job, the job cannot be executed, and the image forming apparatus displays that the job cannot be executed. The operator cannot understand what to do on the various trays to overcome such cases, which cases take long times to recover the apparatus to be executable, which result in deterioration of the productivity rate.

The present invention has been achieved to solve the above problems, and an object of the present invention is to supply an image forming apparatus, which is able to increase the productivity rate in the above cases.

SUMMARY OF THE INVENTION

To achieve at least one of the abovementioned objects, an image forming apparatus, reflecting one aspect of the present invention comprises: plural sheet-feeding trays; and a control section that is configured to display a schedule image to show an execution schedule of a job on a display section, wherein the control section is capable of displaying a job execution schedule displaying column to show the execution schedule of the job, and an un-executable job displaying column to show that the job is un-executable, both columns being included in the schedule image, wherein when a job represents a tray specifying job that specifies a sheet-feeding tray to be used among the plural sheet-feeding trays, and if the job is un-executable using the sheet-feeding tray specified by the tray specifying job, the control section controls the un-executable job displaying column, not to display that the job is un-executable, even though the job is un-executable, and the control section further controls the job execution schedule displaying column to show that the job is not executable, while corresponding the job with the sheet-feeding tray specified by the job.

Based on the above image forming apparatus, if the job is not executable using the specified tray, the control section does not display that the job is not executable, on the un-executable job displaying column, though the job is not executable, but the control section displays on the job execution schedule displaying column, that the job is not executable, while corresponding the job with the sheet-feeding tray specified by the job. That is, if the tray specifying job is not executable, the control section makes the job to correspond with the sheet-feeding tray specified by the job, and displays that the job is not executable. Due to the above operations, the operator can understand the specified tray, and can conduct various recovery operations, such as a sheet replenishment, and change of settings, for said specified tray. Accordingly, the recovery operation can be conducted at high speed, and the productivity, using the image forming apparatus, can be increased.

Further, on the image forming apparatus described above, when the job represents an automatic job to select a sheet-feeding tray which accommodates the sheets, having sheet contents equal to sheet contents specified by the job, among the plural sheet-feeding trays, and simultaneously when there is no sheet-feeding tray accommodating sheets having the sheet contents equal to the sheet contents specified by the job, the control section controls the un-executable job displaying column to display that the job is not executable.

Based on the above image forming apparatus, if the job is the automatic job, and simultaneously if there is no sheet-feeding tray which accommodates the sheets having the sheet contents equal to the sheet contents which the job specifies, the control section displays that the job is not executable, on the un-executable job displaying section. Accordingly, for the automatic job, that is, when the recovery operation has been conducted on any sheet-feeding trays, the job becomes executable, and the un-executable job displaying column displays that the job is not executable, whereby the operator can expand the range of choices for the sheet-feeding tray, while the sheet-feeding tray to be recovered cannot be limited, which increases the convenience of the apparatus.

Still further, on the image forming apparatus described above, the control section can display a setting changing screen, on which a setting of the sheet contents of sheets accommodated in each sheet-feeding tray can be set, and on which the sheet-feeding tray for supplying the sheets for executing the job can be changed, whereby the control section can change the setting of the sheet contents of sheets accommodated in each sheet-feeding tray, and can change the sheet-feeding tray which supplies the sheets for executing the job, based on instructions offered by an operator, while the setting changing screen is displayed.

Based on the above image forming apparatus, since both the setting of the sheet contents of sheet accommodated in each sheet-feeding tray, and the sheet-feeding tray to supply the sheet for executing the job, are changeable, based on the instructions offered by the operator, while the setting changing screen has been displayed, the operator can change the sheet contents of the sheets accommodated in the sheet-feeding tray by him/herself, so that the convenience of the apparatus increases.

Still further, on the image forming apparatus described above, when the job represents the tray specifying job, the control section prevents the sheet-feeding tray to be changed to another sheet-feeding tray, other than the specified sheet-feeding tray.

Based on the above image forming apparatus, if the job represents the tray specifying job, the control section prevents the sheet feeding tray to be changed to a sheet-feeding tray other than the specified sheet-feeding tray. Accordingly, in case that the sheets must be supplied from the specified sheet-feeding tray, like the case of the tray specifying job, adverse events, in that the sheet-feeding tray is changed, are prevented, so that false printing operations can be prevented.

Still further, on the image forming apparatus described above, when the job represents the tray specifying job, and when the sheet-feeding tray, which has been specified by a job being specified formerly of the present tray specifying job, is used, the control section prevents the change of settings of the sheet contents of the specified sheet-feeding tray.

Based on the above image forming apparatus, if the job represents the tray specifying job, and if the sheet-feeding tray which has been specified by the job, being specified formerly of the present tray specifying job, the control section prevents the change of setting of the sheet contents of the specified sheet-feeding tray. Accordingly, adverse events, in that settings of the sheet contents may be changed, and settings of the sheet contents for the previous job, which has been specified formerly of the present tray specifying job, may be also changed, is prevented so that the present job can be effectively executed.

Still further, on the image forming apparatus described above, when the job represents the automatic job, the control section prevents the change of settings of the sheet contents, for the sheet-feeding tray which supplies the sheet by the job, being specified formerly of the automatic job.

Based on the above image forming apparatus, if the job represents the automatic job, the change of settings of the sheet contents is allowed, for the sheet-feeding tray which does not supply the sheet by the job, being specified formerly of the automatic job, among the plural sheet-feeding trays. Accordingly, adverse events, in that settings of the sheet contents may be changed, and settings of the sheet contents for the job, being specified formerly of the automatic job, may also be changed, are prevented, so that the job can be effectively executed.

Still further, on the image forming apparatus described above, when the job represents the tray specifying job, the control section allows the sheet-feeding tray to be changed to a sheet-feeding tray, which is other than the specified sheet-feeding tray.

Based on the image forming apparatus described above, if the job represents the tray specifying job, the sheet-feeding tray is allowed to be changed to a sheet supplying tray, which is other than the specified sheet-feeding tray. Accordingly, in case that the recovery operation is very difficult on the specified sheet-feeding tray, or in case that the productivity is reduced due to the absolute inhibition of changing the sheet-feeding tray, the change of the sheet-feeding tray can be executed, so that the deterioration of productivity is prevented.

Still further, on the image forming apparatus described above, when the job represents the tray specifying job, the control section prevents the change of settings of the sheet contents, for the sheet-feeding tray to be used in the job, being specified formerly of the tray specifying job, among the sheet-feeding trays, other than the specified sheet-feeding tray.

Based on the image forming apparatus described above, if the job represents the tray specifying job, the change of settings of the sheet contents, for the sheet-feeding tray to be used in the job, being specified formerly of the tray specifying job, among the sheet-feeding trays, other than the specified sheet-feeding tray, is prevented. Accordingly, if the job represents the tray specifying job, adverse events, in that though the change of the sheet-feeding tray to the sheet feeding tray other than the specified sheet-feeding tray is allowed, the job, being specified formerly of the present job, may be adversely operated, can be prevented.

BRIEF DESCRIPTION OF THE DRAWINGS

Embodiments will now be described, by way of example only, with reference to the accompanying drawings which are meant to be exemplary, not limiting, and wherein like elements are numbered alike in the several figures, in which:

FIG. 3 is a schematic diagram showing a stacking section indicated in FIG. 1, FIG. 5 is a diagram showing settings of sheet contents in each sheet-feeding tray and showing inputted jobs, and FIG. 5a shows settings of contents of sheets in each sheet-feeding tray, while FIG. 5b shows inputted jobs, FIG. 6 is a diagram showing the settings of sheet contents in each sheet-feeding tray shown in FIG. 5 and showing schedule images corresponding to jobs, FIG. 7 is a first diagram showing an example of a setting changing screen, FIG. 8 is a first diagram showing a job inputted, FIG. 11 is a diagram showing a schedule image in the case of supplying sheets to tray 8 in the examples shown in FIG. 8 and FIG. 9, FIG. 15 is a diagram showing an example of an input image for an image forming apparatus relating to the present embodiment.

DETAILED DESCRIPTIONS OF THE PREFERRED EMBODIMENTS

Figure 1:
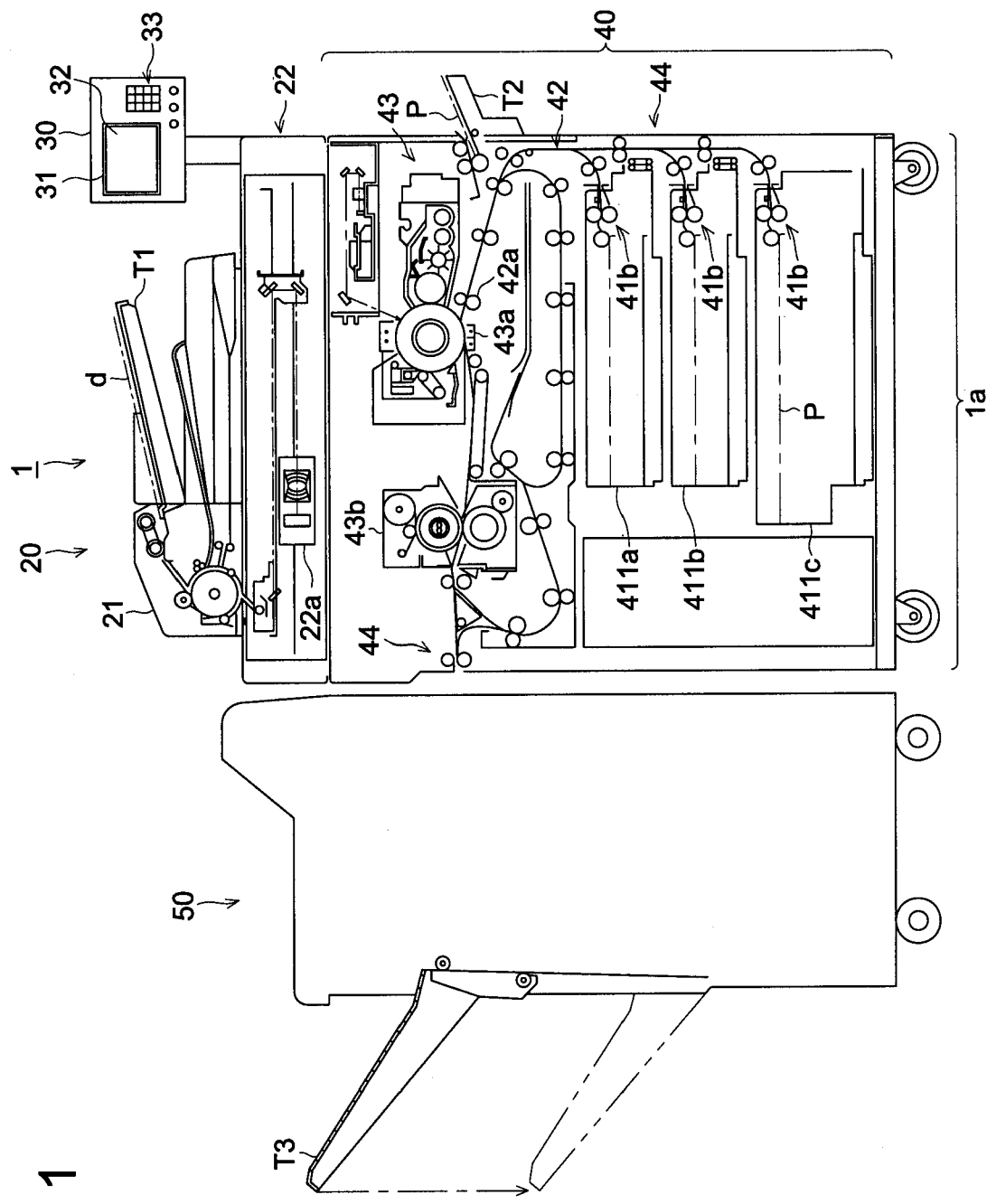
FIG. 1 is a schematic construction diagram showing an image forming apparatus relating to the present embodiment.

The invention will be explained as follows based on the embodiments of the invention, to which, however, the invention is not limited. FIG. 1 is a schematic construction diagram showing an image forming apparatus relating to the present embodiment.

Image forming apparatus 1 relating to the present embodiment is a digital multifunctional peripheral equipped with main body section 1*a* and post processing apparatus 50, and the main body section 1*a* is one that reads images from document d, and forms images on sheet P from the images thus read. Further, the main body section 1*a* receives job information of job including page data including image data and established information such as image forming conditions for each image data from outer apparatuses, and forms images on sheet P based on the received job information. This main body section 1*a* is composed of image reading section 20, operation/display section 30, and print section 40.

Image reading section 20 is one that is equipped with automatic document feeder 21 called ADF (Automatic Document Feeder) and with reading section 22, and reads images of plural documents based on established information accepted by operation/display section 30. Document d placed on document tray T1 of the automatic document feeder 21 is transported to contact glass representing a reading portion, and images on one side or on both sides of the document are read by CCD (Charge Coupled Device) 22*a* through an optical system. Incidentally, images mentioned here are not limited to image data such as drawings and photographs, but also they represent a concept that includes text data such as characters and symbols.

Image data (analog image signals) of images which have been read by image reading section 20 are outputted to reading processing section 140 of image control section 100 that will be described later, then, are A/D-converted in the reading processing section 140 and are subjected to various types of image processing, to be outputted to print section 40.

Operation/display section 30 is composed of LCD (Liquid Crystal Display) 31 that functions as a display device, touch panel 32 provided to cover LCD 31 and of group of operation keys 33, and it receives instructions from a user through the touch panel 32 or the group of operation keys 33, to output operation signals based on the aforesaid instructions to control section 110 which will be described later. Further, the operation/display section 30 displays various types of images and results of processing on LCD 31, according to display signals inputted from the control section 110.

Print section 40 is one to carry out image forming processing of an electro-photography method based on inputted image data, and it is composed of stacking section 41, sheet conveyance section 42, image forming section 43 and carrying out section 44.

The stacking section 41 is equipped with plural sheet-feeding trays 411*a*-411*c*, sheet-feeding device 41*a* and hand feeding tray T2. Each of sheet-feeding trays 411*a*-411*c* is loaded with sheets P with prescribed type in advance, and it conveys sheet P one sheet by one sheet from the uppermost sheet with the sheet-feeding device 41*a* toward the sheet conveyance section 42. Incidentally, in the example shown in FIG. 1, three sheet-feeding trays 411*a*-411*c* are provided. However, the number of sheet-feeding trays is not limited to three, and it may also be two or four.

Hand feeding tray T2 is capable of being loaded with sheets P in various types to comply with needs of users, and it is one that conveys stacked sheets P one sheet by one sheet from the uppermost sheet toward the sheet conveyance section 42.

The sheet conveyance section 42 is one to convey sheet P conveyed from each of sheet-feeding trays 411*a*-411*c* or from hand feeding tray T2 to transfer apparatus 43*a* through plural intermediate rollers and registration roller 42*a*. Further, the sheet conveyance section 42 has a function to convey sheet P that has been processed in terms of one side image forming by a conveyance path switching plate to a two-sided conveyance path, and to convey the sheet P to transfer apparatus 43*a* through intermediate rollers and registration roller 42*a* again.

Image forming section 43 is composed of a photoreceptor drum, a charging unit, an exposure unit having therein a laser output section that emits a laser beam based on image data and a polygon mirror that causes the laser beam to scan in the main scanning direction, a developing unit, a transfer unit 43*a*, a cleaning section, and fixing unit 43*b*, and it is one that forms images on sheet P based on job information. In the case of actual and specific image forming, the exposure unit emits a laser beam to illuminate a photoreceptor drum charged by the charging unit, and it forms an electrostatic latent image. Then, toner charged by the developing unit is caused to stick to the surface of the photoreceptor drum on which the electrostatic latent image is formed, whereby, the electrostatic latent image is developed. A toner image thus formed on the photoreceptor drum by the developing unit is transferred onto sheet P in the transfer unit 43*a*. Toner remaining on the surface of the photoreceptor drum is removed by a cleaning section.

The fixing unit 43*b* is one that fixes a toner image transferred onto sheet P conveyed by sheet conveyance section 42. Sheet P on which fixing has been terminated is interposed by sheet ejection rollers of sheet-ejection section 44 to be conveyed to post processing apparatus 50 from an ejection outlet.

post processing apparatus 50 is equipped with various types of post processing units such as a sorting unit, a folding unit, a punch unit and a staple unit, and it is one to conduct sorting processing, folding processing, punching processing and stapling processing to staple a bundle of sheets P at a prescribed established stapling position. Further, the post processing apparatus 50 is equipped with sheet-ejection tray T3 on which sheets P that have been subjected to image forming by main body section 1*a* and sheets P which have been subjected to various types of post processing are stacked.

Figure 2:
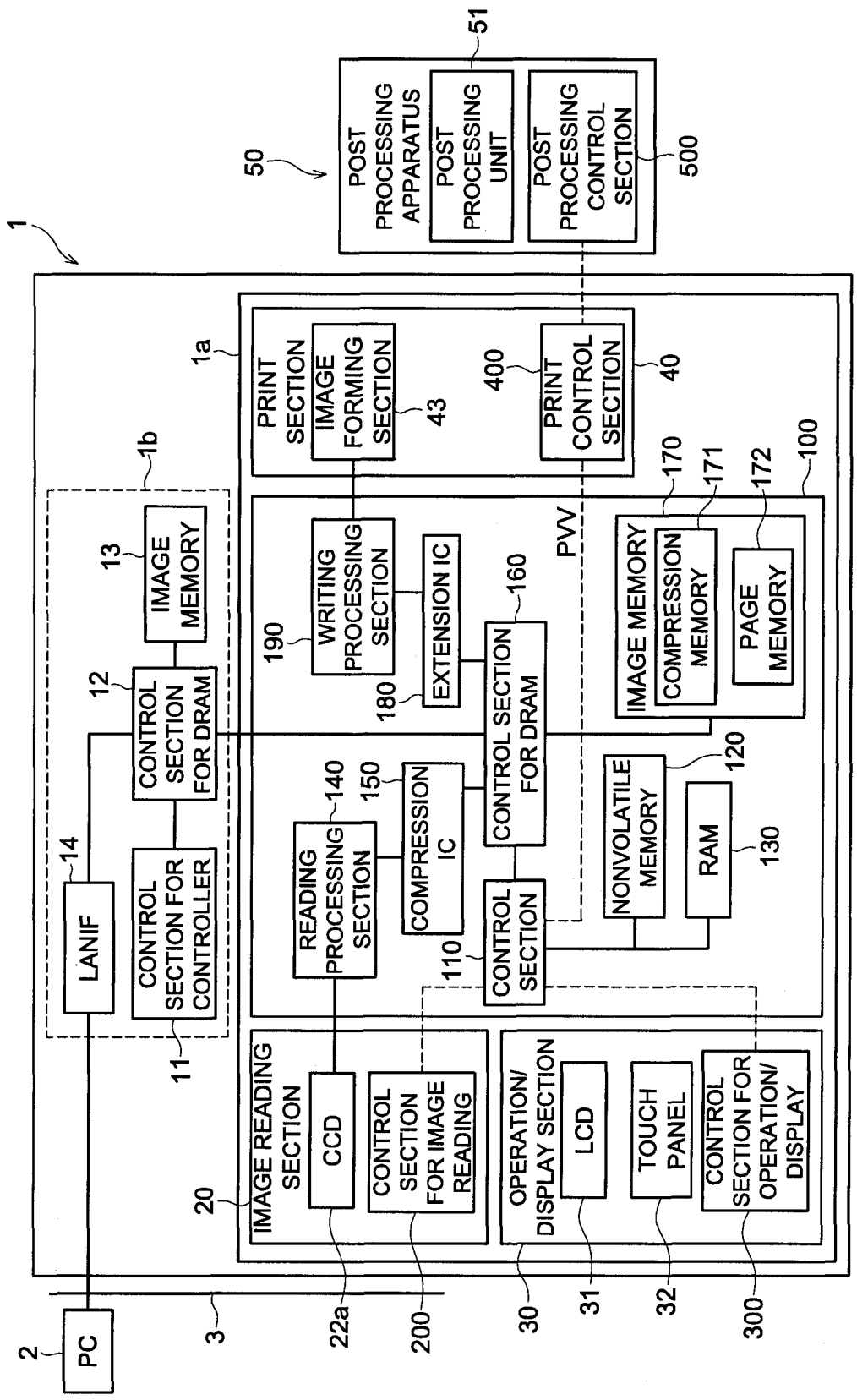
FIG. 2 is a control block diagram showing the construction of an image forming apparatus relating to the present embodiment.

FIG. 2 is a control block diagram showing the construction of image forming apparatus 1 relating to the present embodiment. As is shown in FIG. 2, the image forming apparatus 1 is equipped with printer controller 1*b* in addition to main body section 1*a* and post processing apparatus 50 both shown in FIG. 1. This printer controller 1*b* is used when using the image forming apparatus 1 as a network printer, and it receives data from PC2, and transmits the data to main body section 1*a* as image data or jobs.

The printer controller 1*b* of this kind is equipped with control section for controller 11, control section for DRAM (Dynamic Random Access Memory) 12, image memory 13 and with LANIF (Local Area Network Interface) 14.

The control section for controller 11 controls operations of respective portions of printer controller 1*b* on a supervision basis, and transmits data inputted from PC2 through LANIF 14 to main body section 1*a* as a job.

The control section for DRAM 12 controls storage of data received by LANIF 14 into image memory 13 and controls reading of data from image memory 13. Further, the control section for DRAM 12 is connected to control section for DRAM (Dynamic Random Access Memory) 160 of image control section 100 with PCI (Peripheral Components Interconnect) bus, and it reads out data for applicable print from image memory 13 according to instructions from control section for controller 11, and outputs the image data to the control section for DRAM 160.

The image memory 13 is composed of DRAM, and it is one wherein image data are stored temporarily. The LANIF 14 is a communication interface to be connected to LAN network such as MC (Network Interface Card) or modem, and it receives data from PC2. Data received by LANIF 14 are outputted to control section for DRAM 12.

Further, main body section 1a is equipped with image control section 100, in addition to image reading section 20, operation/display section 30 and print section 40 all shown in FIG. 1. Further, the image control section 100 has therein control section 110, nonvolatile memory 120, RAM (Random Access Memory) 130, reading processing section 140, compression IC (Integrated Circuit) 150, control section for DRAM 160, image memory 170, extension IC 180, and writing processing section 190.

Control section 110 is composed of CPU (Central Process Unit) and others, and it is one to control each section of image forming apparatus 1 intensively. The nonvolatile memory 120 is one wherein system program and various types application programs are stored. The RAM 130 is one to function as a work area that stores various types of data. Due to the construction of this kind, the control section 110 reads out a specified program from system programs and various application programs stored in nonvolatile memory 120, and develops it on RAM 130, and then, carries out various types of processing under the cooperation with the program developed on RAM 130, and controls each section of image forming apparatus 1 intensively.

The reading processing section 140 is one wherein analog image signals inputted from CCD22a are given various types of processing such as analog processing, A/D conversion processing and shading processing, and then, digital image data are generated. The compression IC 150 is one wherein inputted digital image data are compressed, and are outputted to control section for DRAM 160.

The control section for DRAM 160 is one wherein compression processing for image data by compression IC 150 is controlled, and extension processing of compression image data by extension IC 180 is controlled, in accordance with instructions from control section 110, and input and output of image data for image memory 170 are controlled. The image memory 170 is one to store image data. The extension IC 180 is one to give extension processing to compression image data which has been given compression processing by compression IC 150.

Further, image memory 170 is composed of compression memory 171 and page memory 172. The compression memory 171 is one to store compression image data compressed by compression IC 150. The page memory 172 is one to store image data which has been given extension processing by extension IC 180.

Owing to the construction of this kind, the control section for DRAM 160 causes compression IC 150 to conduct compression processing of image data inputted from reading processing section 140, when preservation of image signals read by image reading section 20 is instructed. Then, the control section for DRAM 160 causes compression memory 171 to store compression image data compressed by compression IC 150. When output of print for compression image data stored in compression memory 171 is instructed, the control section for DRAM 160 reads compression image data from compression memory 171, then, gives extension processing by extension IC 180 to cause page memory 172 to store the data. After storing, the control section for DRAM 160 reads image data from page memory 172 and outputs them to writing processing section 190, when output of print for image data stored in page memory 172 is instructed.

The writing processing section 190 is one to generate print data for image forming, based on image data inputted from control section for DRAM 160, and to output them to print section 40.

Further, the image reading section 20 is equipped with automatic document feeder 21 shown in FIG. 1 (illustration is omitted in FIG. 2), CCD22a and with control section for image reading 200. The control section for image reading 200 is one that controls the automatic document feeder 21 and reading section 22 to cause a document surface to be scanned for exposure scanning. Due to this exposure scanning, reflected light is inputted in CCD22a to be converted on a photoelectric basis, and is outputted to reading processing section 140 as analog image data.

The operation/display section 30 is equipped with SCD 31 shown in FIG. 1, touch panel 32, operation key 33 (whose illustration is omitted in FIG. 2) and with control section for operation/display 300. The control section for operation/display 300 is one to cause various types of images to be displayed on LCD31, in accordance with display signals inputted from control section 110. Accordingly, the control section for operation/display 300 and the control section 110 function as a control device that controls contents of a display. And, the control section for operation/display 300 is one to output operation signals inputted from group of operation keys 33 to control section 110.

The print section 40 is equipped with image forming section 43 shown in FIG. 1 and with print control section 400. The print control section 400 controls respective portions of the print section 40 in accordance with instructions from the control section 110, and causes sheet P to form images thereon based on print data inputted from writing processing section 190. Further, the print control section 400 transmits post processing signals according to the instructions coming from control section 110 to post processing apparatus 50.

The post processing apparatus 50 is equipped with post processing unit 51 and post processing control section 500 (which are not shown in FIG. 1). The post processing unit 51 is composed of the aforesaid sorting unit. The post processing control section 500 is one to control the post processing unit 51, and it controls driving of respective portions to cause sheet P to receive post processing depending on post processing signals inputted from the print control section 400, and to cause sheet P to be ejected to sheet-ejection tray T3.

Figure 3A:
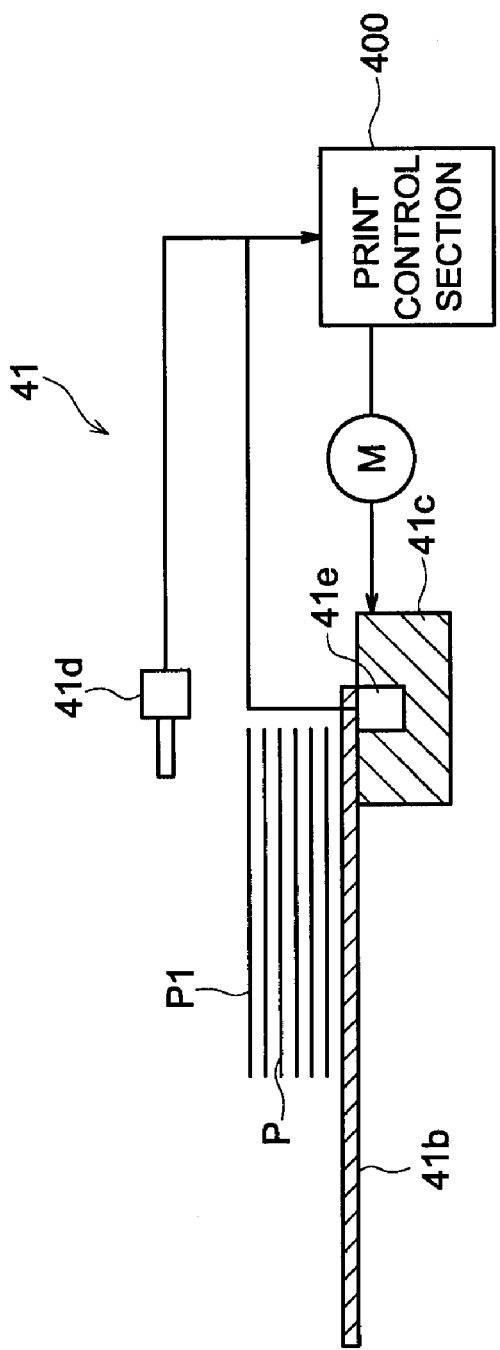
FIG. 3a shows the first state and FIG. 3b shows the second state.
Figure 3B:
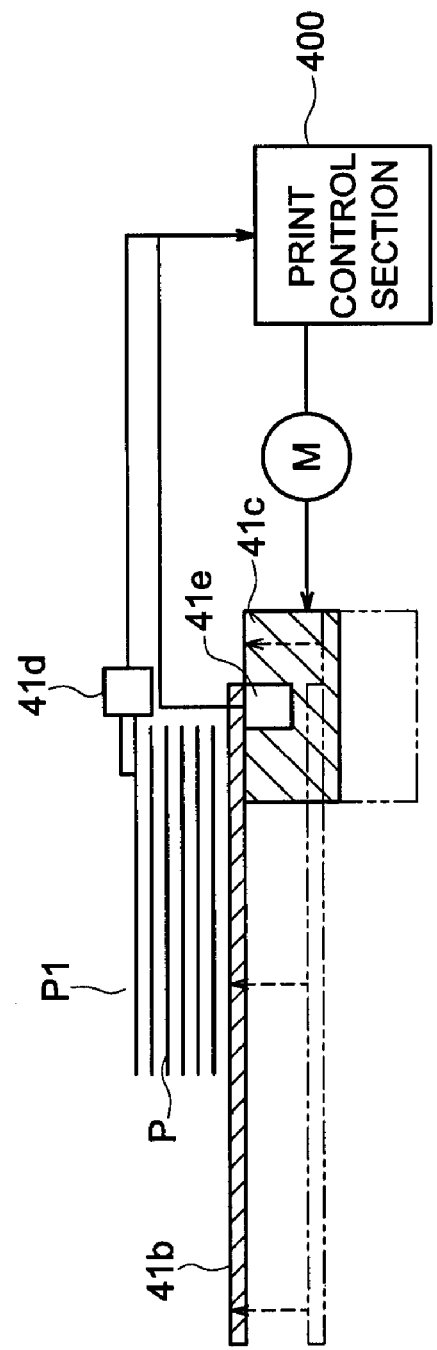

Now, the stacking section 41 will further be explained. FIG. 3 is a schematic diagram showing a stacking section 41 indicated in FIG. 1, and FIG. 3 a shows the first state and FIG. 3 b shows the second state. As shown in FIGS. 3 a and 3 b, the stacking section 41 is equipped roughly with placing section 41b, lift-up section 41c, sheet position detection sensor 41d, and sheet existence detection sensor 41e.

The placing section 41b is a region where sheet P is placed. The lift-up section 41c is one that functions as a lift-up device which lifts up the uppermost sheet P1 among sheets P placed on the placing section 41b to the prescribed position. This lift-up section 41c is arranged to lift up or to lower down the placing section 41b through driving by motor M that is driven by print control section 400. Specifically, the lift-up section 41c is lowered down to the lowest position shown in FIG. 3a, when sheet-feeding trays 411a-411c are drawn out of main body section 1a of image forming apparatus 1, and they are lifted up to the position shown in FIG. 3 b, when sheet-feeding trays 411a-411c are pushed in the main body section 1a of image forming apparatus 1.

When the placing section 41b is lifted up by lift-up section 41c, the sheet position detection sensor 41d is touched by uppermost sheet P1 among sheets P placed on placing section 41*b* to detect its contact. Upon its contact with the uppermost sheet P1, the sheet position detection sensor 41*d* transmits the signal to that effect to print control section 400, and the print control section 400 stops motor M. Sheet existence detection sensor 41*e* detects whether a sheet is placed on placing section 41*b* or not.

Further, the print control section 400 estimates an amount of lifting up by the lift-up section 41*c*, and estimates the number of sheets for sheets P stored in sheet-feeding trays 411*a*-411*c*, based on signals coming from the sheet existence detection sensor 41*e*.

In the specific explanation, the print control section 400 estimates that the number of sheets is zero, when the signal from the sheet existence detection sensor 41*e* says that no sheet P is stored. Further, the print control section 400 estimates the maximum number of sheets P and the minimum number of sheets P to be stored based on an amount of lift up of the lift-up section 41*c*, when it is possible to judge that at lease one sheet P is stored based on signals coming from the sheet existence detection sensor 41*e*. In this case, the print control section 400 calculates an amount of lift up from the number of rotations of motor M, and a level is obtained from this amount of lift up. The level, for example, means four steps from "1" to "4", and when the level is "4", for example, the maximum number of sheets is estimated to be 550 sheets and the minimum number of sheets is estimated to be 380 sheets. Incidentally, when "0" represents an occasion wherein the number of sheets is estimated to be zero by the signal coming from the sheet existence detection sensor 41*e*, the print control section 400 is to estimate the number of sheets to be stored, using five levels from "0" to "4".

Further, the print control section 400 transmits information of the estimated number of sheets to control section for operation/display 300 through control section 110, and the control section for operation/display 300 controls contents of display of information of the number of sheets for estimation which will be described later, corresponding to the number of sheets for estimation.

Figure 4:
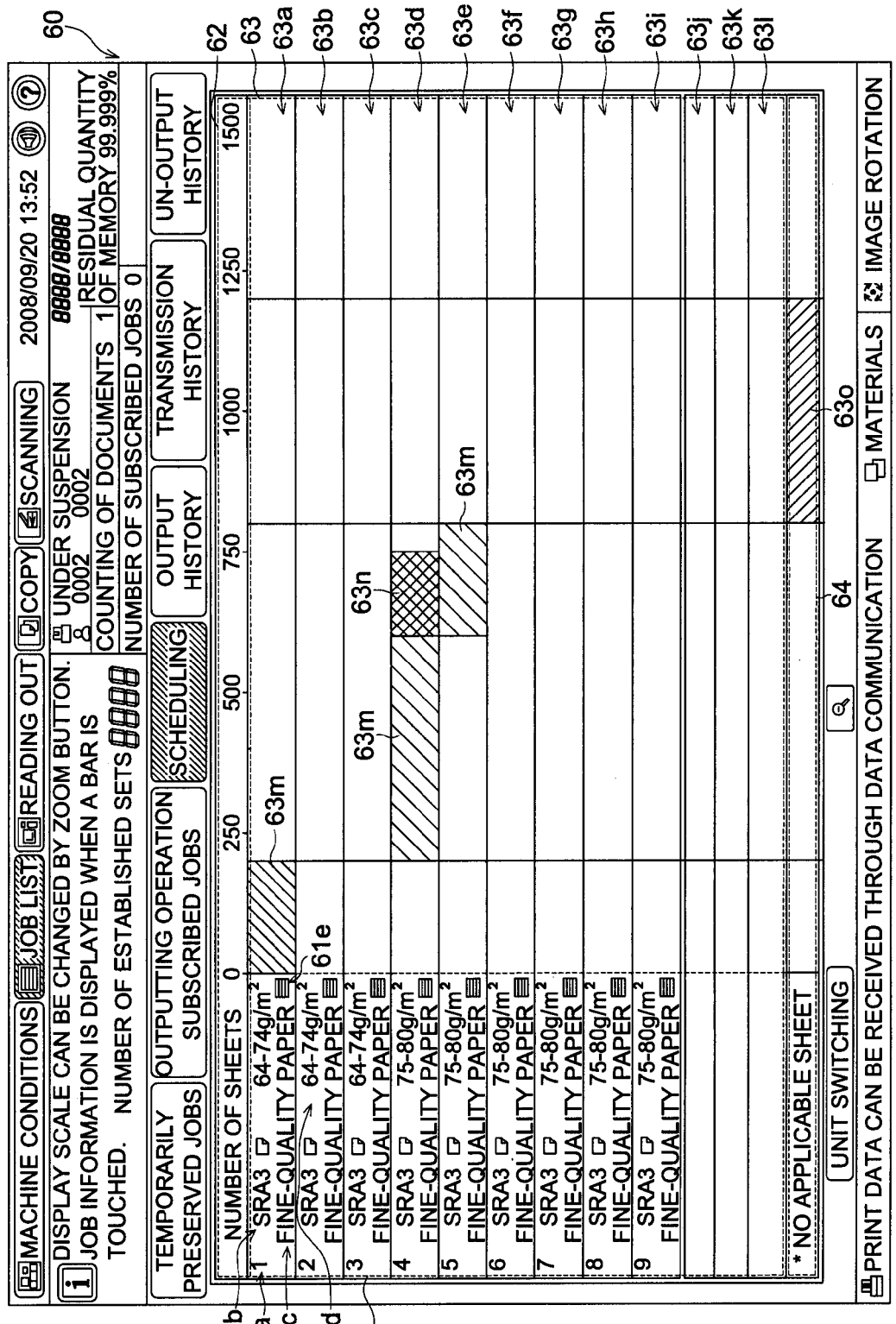
FIG. 4 shows an example of a schedule image.

In addition, image forming apparatus 1 relating to the present embodiment is arranged to display schedule images showing planned jobs on LCD31. FIG. 4 is a diagram showing an example of schedule images 60. Meanwhile, the number of sheet-feeding trays in the following explanations is assumed to be nine.

As shown in FIG. 4, on schedule image 60, there are indicated sheet-feeding tray information display column 61 showing information of each sheet-feeding tray, index displaying column 62, job execution schedule displaying column 63 and un-executable job displaying column 64.

The sheet-feeding tray information display column 61 is a display column on which information of each sheet-feeding tray is displayed, and it is indicated along the vertical axis of the schedule image 60. The information of the sheet-feeding tray is composed of tray number information 61*a* of the sheet-feeding tray, size information 61*b* for sheet P to be stored in the sheet-feeding tray, sheet quality information 61*c* for sheet P to be stored in the sheet-feeding tray, basis weight information 61*d* for sheet P to be stored in the sheet-feeding tray, and estimated number of sheets information 61*e* for sheet P to be stored in the sheet-feeding tray. Meanwhile, the estimated number of sheets information 61*e* is displayed in accordance with a level obtained by print control section 400. Further, though the sheet-feeding tray information display column 61 is displayed along the vertical axis of the schedule image 60, it is also possible to be displayed along the horizontal axis, without being limited to the foregoing.

The index displaying column 62 is a display column that displays an index for the execution of jobs, namely, information serving as a target for the execution of jobs, and it is displayed along the horizontal axis of the schedule image 60. The index for execution of jobs in this case is information, for example, of the number of sheets. Specifically, in the example shown in FIG. 4, there are punctuation marks with an interval of 250 sheets such as 0 sheets, 250 sheets, 500 sheets and 750 sheets in the index displaying column 62. Incidentally, the index for execution of jobs is not limited to the number of sheets, and it may also be other pieces of information such as, for example, information of a period of time for execution of jobs. Further, although the index displaying column 62 is displayed along the horizontal axis of schedule image 60, it may also be displayed along the vertical axis when the sheet-feeding tray information display column 61 is displayed along the horizontal axis of schedule image 60.

The job execution schedule displaying column 63 is a column showing job execution schedule, and the job execution schedules are displayed to correspond to the sheet-feeding tray information display column 61 and index displaying column 62. The job execution schedule displaying column 63 has 12 tray display columns 63*a*-63*i*, for showing plans for execution of the jobs for each sheet-feeding tray.

The un-executable job displaying column 64 is a display column that displays that the execution of a job is impossible, and it is displayed when a sheet-feeding tray that agrees with sheet P specified by the job is not existent. This un-executable job displaying column 64 is displayed along the vertical axis of schedule image 60.

Next, the state of display for execution schedule for jobs by schedule image 60 will be explained. There will be explained an occasion, wherein image forming on 200 fine-quality sheets each having size of SRA3 and basis weight of 64-74 g/m$^2$ and tray specifying job to specify tray 1 are inputted from PC2, after that, to form images on 600 fine-quality sheets each having size of SRA3 and basis weight of 75-80 g/m$^2$ is inputted, and then to form images on 400 fine-quality sheets each having size of SRA3 and basis weight of 221-256 g/m$^2$ is inputted from PC2. Further, it is assumed that in the example shown in FIG. 4, the minimum number of sheets of sheets P is estimated to be 388 sheets, and the maximum number of sheets is estimated to be 550 sheets.

In this case, the control section 110 of the image forming apparatus 1 judges to use sheet P in tray 1 because the tray 1 is specified by the first job. Further, fine-quality sheets having SRA3 and basis weight of 64-74 g/m$^2$ are specified by the first job, and these sheet contents agree with those of sheet P stored in tray 1. Therefore, control section for operation/display 300 causes printing bar 63*m* that extends from zero for the number of sheets to be displayed on tray display columns 63*a* of tray 1.

Incidentally, the first job is one to specify image forming for 200 sheets. Therefore, the control section for operation/display 300 causes printing bar 63*m* that extends from zero to 200 sheets for the number of sheets be displayed on tray display columns 63*a* of tray 1.

As stated above, when execution of a job is possible in schedule image 60, the control section 110 causes execution schedules to be displayed, by corresponding to the sheet-feeding tray on which the job among jobs in job execution schedule displaying column 63 is to be executed.

Next, the control section 110 of the image forming apparatus 1 judges that trays 4-9, storing fine-quality sheets having SRA3 and basis weight of 75-80 g/m$^2$, can be used for the second job. Then, the control section 110 selects using of sheets P stored in tray 4 for the job for 600 sheets first.

Accordingly, the control section for operation/display 300 causes printing bar 63*m* that extends from 200 sheets for the number of sheets on the tray display columns 63*d* of tray 4 to be displayed.

In this case, there is a possibility that the number of sheets P stored in the tray 4 is only 388 sheets. Therefore, the control section for operation/display 300 causes printing bar 63*m* that extends to 588 sheets from 200 sheets in terms of the number of sheets to be displayed on tray display column 63*d* of tray 4. Further, the control section for operation/display 300 causes auxiliary bar 63*n* that extends from 588 sheets representing a rear end position of printing bar 63*m* to be displayed. Incidentally, this auxiliary bar 63*n* is displayed with a length of 162 sheets that is a difference between the maximum number of sheets 550 sheets and the minimum number of sheets 388 sheets. Namely, the auxiliary bar 63*n* grows to extend from 588 sheets to 750 sheets. This auxiliary bar 63*n* shows a possibility that sheets P may be remaining in a sheet-feeding tray of image forming apparatus 1.

Incidentally, in an example shown in FIG. 4, the second job is one that specifies image forming for 600 sheets. Therefore, the auxiliary bar 63*n* is displayed with a length of 162 sheets. However, when the maximum number of sheets P stored in tray 4 is greater, such as an occasion where the second job specifies image forming for 450 sheets, for example, the auxiliary bar 63*n* becomes to be a length that corresponds to 62 sheets which is a difference between 450 sheets for terminated job and the minimum number of sheets.

Further, sheets P run short for the second job, because the number of sheets P stored in tray 4 is 388 sheets to 550 sheets at the most. Therefore, the control section 110 selects a method to use sheets P stored in tray 5 after using up all sheets P in tray 4 by ATS (Auto Tray Switch) functions. Therefore, the control section for operation/display 300 causes printing bar 63*m* that extends from sheet number 588 sheets in tray display column 63*e* of tray 5 to be displayed, by corresponding to the position of 588 sheets representing a rear end position of printing bar 63*m* displayed on tray display column 63*a* of tray 1. This printing bar 63*m* becomes one that extends to 200+600=800 representing job termination. Incidentally, ATS functions are functions to detect other sheet-feeding tray based on the job, and to switch automatically a destination for the detected sheet-feeding tray.

Next, the control section 110 of image forming apparatus 1 judges that any sheet-feeding tray cannot be used for the third job. In other words, the control section 110 judges that any sheet-feeding tray cannot be used, because there is no sheet-feeding tray that is shown by the third job and stores fine-quality sheets having size SRA3 and basis weight of 221-256 g/m². Therefore, the control section for operation/display 300 causes un-execution showing bar 63*o* to be displayed on un-executable job displaying column 64. This un-execution showing bar 63*o* turns out to be one that extends from 800 sheets representing a termination point of the second job to 1200 sheets that is obtained by adding 400 sheets of image forming of the third job to 800 sheets.

The foregoing is the state of display for the schedule image 60. Further, in the image forming apparatus 1 relating to the present embodiment, characteristic display is carried out for improving productivity for the job of tray designation when the job is impossible.

FIG. 5 is a diagram showing the settings of sheet contents in each sheet-feeding tray and showing inputted jobs, and FIG. 5*a* shows the settings of contents of sheets in each sheet-feeding tray, while FIG. 5*b* shows inputted jobs. As is shown in FIG. 5*a*, profile No. concerning color control is set to "not specified", a sheet size is set to "A3", a sheet type is set to "plain paper", a sheet name is set to "plain paper", a basis weight is set to "64-74 g/m²", a sheet color is set to "white", and a punched hole on a sheet is set to "none" for tray 1. With respect to tray 2-tray 9, information is established for each item as follows, as shown in FIG. 5*a*.

Let it be assumed that jobs shown in FIG. 5*b* are inputted under the conditions where contents of sheets for respective sheet-feeding trays are set as stated above. Namely, let it be assumed that the first job is a tray designation job to specify tray 1, profile No. is "not specified", a sheet size is "A3", a sheet type is "plain paper", a sheet name is "plain paper", a basis weight is "64-74 g/m²", a sheet color is "white", and a punched hole on a sheet is "none". Further, the second job is a tray designation job to specify tray 3, profile No. is "not specified", a sheet size is "SRA3", a sheet type is "plain paper", a sheet name is "plain paper", a basis weight is "64-74 g/m²", a sheet color is "white" and a punched hole on a sheet is "none". Further, the third job is a tray designation job to specify tray 1, profile No. is "not specified", a sheet size is "A3", a sheet type is "fine-quality sheet", a sheet name is "fine-quality sheet", a basis weight is "257-300 g/m²", a sheet color is "white", and a punched hole on a sheet is "none". It is further assumed that the first job specifies image forming for 100 sheets of sheets P. It is still further assumed that 350 sheets are for the second job, and 400 sheets are for the third job.

Figure 6:
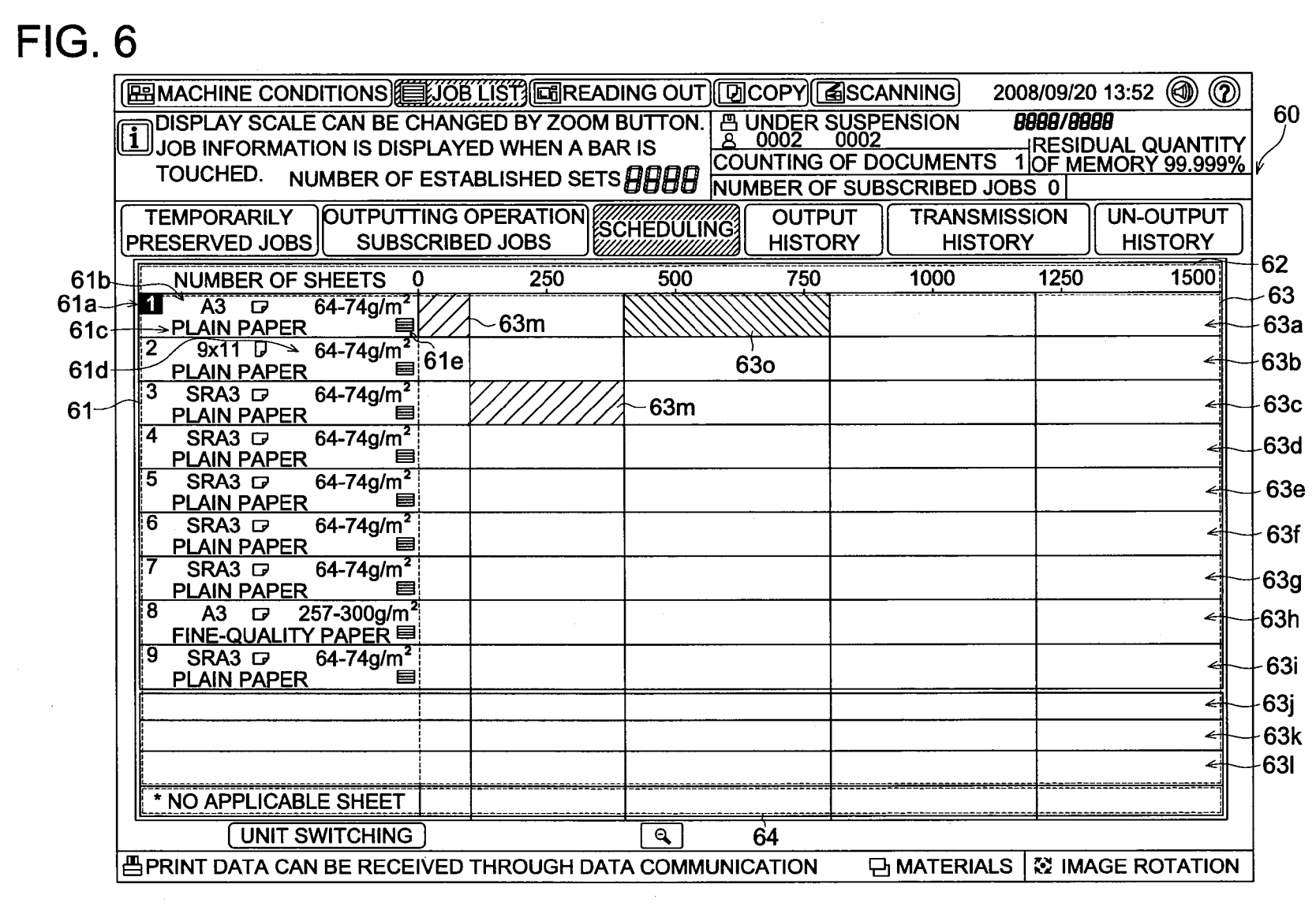

FIG. 6 is a diagram showing schedule image 60 corresponding to the settings of sheet contents in each sheet-feeding tray shown in FIG. 5 and corresponding to jobs. In the case of the example shown in FIG. 5, the control section 110 first judges whether the settings of sheet contents in tray 1 specified by the first job and sheet contents specified by the job agree with each other or not. Since they agree with each other in the example shown in FIG. 5, the control section for operation/display 300 causes printing bar 63*m* extending from 0 to 100 sheets to be displayed on tray display columns 63*a* of tray 1.

Further, the control section 110 first judges whether the setting of sheet contents in tray 3 specified by the second job agrees with sheet contents specified by the job or not. In each of examples shown in FIG. 5 and FIG. 6, both of them agree with each other. Therefore, the control section for operation/display 300 causes printing bar 63*m that extends from* 100 sheets to 450 sheets for the number of sheets to be displayed on tray display column 63*c* of tray 3.

Next, the control section 110 judges whether the setting of sheet contents in tray 1 specified by the third job agrees with sheet contents specified by the job or not. In this case, the setting of sheet contents in tray 1 does not agree with sheet contents specified by the job, in examples shown in FIG. 5 and FIG. 6. Therefore, the job cannot be executed with the specified sheet-feeding tray. However, in the present embodiment, the control section for operation/display 300 does not display, on the un-executable job displaying column 64, the un-execution showing bar 63*o* that shows un-execution of the job, in spite of the un-execution of the job, but it displays that the job cannot be executed corresponding to tray 1 specified by the job.

Specifically, in image forming apparatus 1 relating to the present embodiment, the control section for operation/display 300 causes un-execution showing bar 63*o* to be displayed on tray display column 63*a* of tray 1 by corresponding to tray 1 specified by the job, and causes coloring display 65 to be displayed on tray No. information 61*a* of a sheet-feeding tray, among sheet-feeding tray information display columns 61, on a supplemental basis. Since the third job is a tray designating that specifies tray 1 in the examples shown in FIGS. 5 and 6, as stated above, un-execution showing bar 63*o* is caused to be displayed on tray display column 63*a* of tray 1, coloring display 65 is caused to be displayed on tray No. information 61*a* of a sheet-feeding tray, for the purpose of informing a user that tray 1 has been specified by the job. This display makes a user to know that tray 1 should be used for forming images, and the user understands that changes of setting for sheet contents in tray 1 and reloading of sheet P stored in tray 1 are necessary, which results in smooth recovery operations. Incidentally, the un-execution showing bar 63*o* mentioned above is displayed with a length that extends to 850 sheets in terms of the number of sheets from 450 sheets in terms of the number of sheets. Further, in the example shown in FIG. 6, half-toning that is colored to be tray number information 61*a* may also be changed to be in another way to indicate a tray. Moreover, it is also possible to conduct only one display among a display of the un-execution showing bar 63*o* and a display of the coloring display 65.

Figure 7:
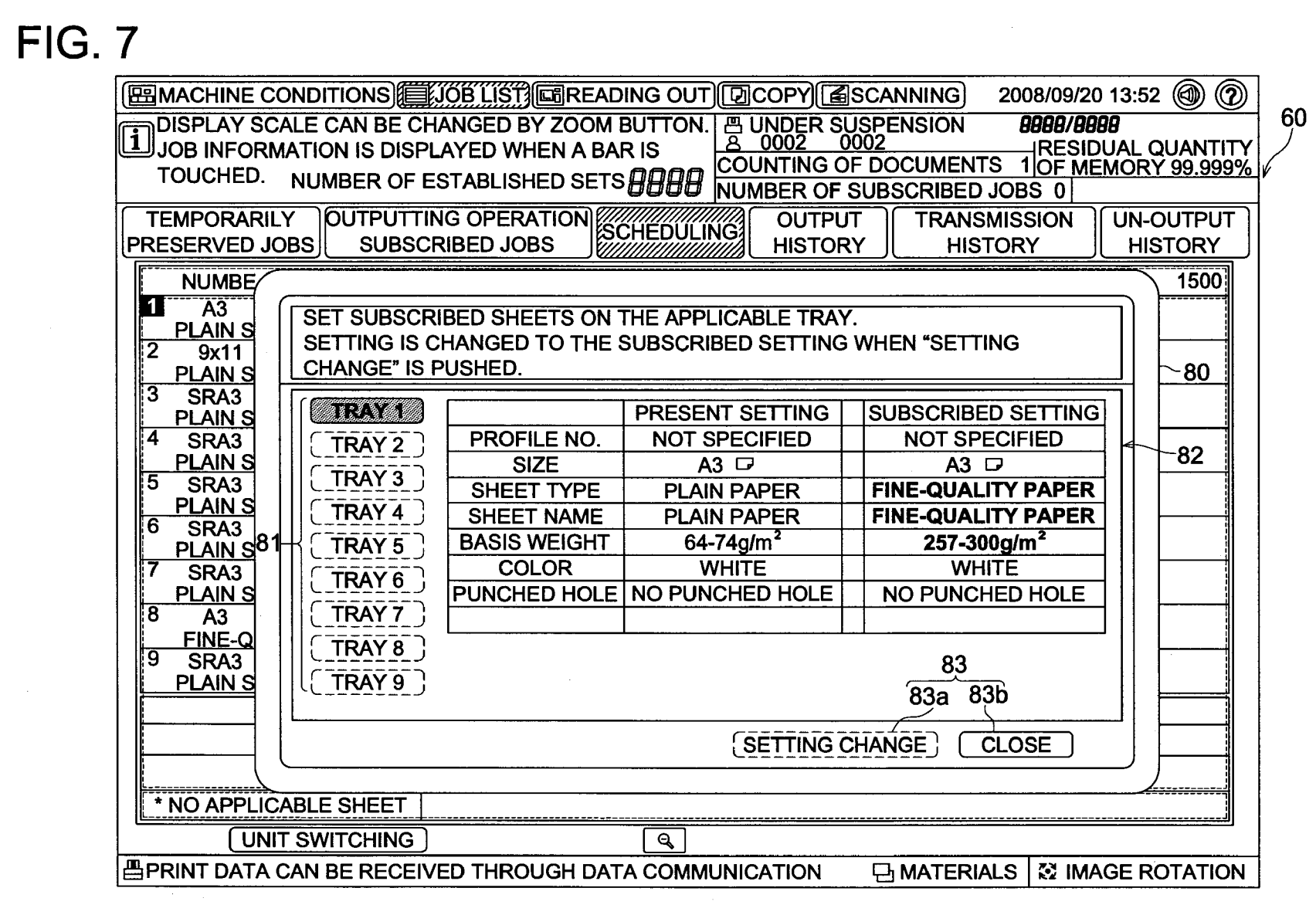

FIG. 7 is a first diagram showing an example of a setting changing screen. As shown in FIG. 6, when the un-execution showing bar 63*o* is displayed, it is possible to cause setting changing screen 80 that is shown in FIG. 7 to be displayed by pressing down a display portion of the un-execution showing bar 63*o*. The setting changing screen 80 is an image area that makes it possible to change a sheet-feeding tray that feeds sheets for setting of sheet contents of each sheet-feeding tray and for the execution of the job. A user can change a sheet-feeding tray that feeds sheets for setting of sheet contents for each sheet-feeding tray and for the execution of the job, by conducting inputting operations in the course of display by the setting changing screen 80.

The setting changing screen 80 will be explained in detail as follows. On the setting changing screen 80, there are displayed tray change display column 81, sheet setting display column 82, and operation button 83. The tray change display column 81 is a display column for a user to select a sheet-feeding tray which is selected by the user. The user can change a sheet-feeding tray representing a destination of sheet-feeding for sheet P, by selecting any one of sheet feeding trays displayed on tray change display column 81. Meanwhile, in the example shown in FIG. 7, a change to a sheet-feeding tray other than the specified tray 1 is prohibited because the job is a tray specifying job. Namely, with respect to the sheet-feeding tray other than tray 1, they are in the state of half-toning, and a selection is prohibited.

The sheet setting display column 82 is a display column that displays settings of sheet contents for a sheet-feeding tray as a "present setting" and displays sheet contents shown by the job as "reserved setting". Further, in the sheet setting display column 82, colored display is conducted on the different portion in the "present setting" and the "reserved setting". Namely, in the example shown in FIG. 7, colored display is conducted on the sheet type "fine-quality sheet", the sheet name "fine-quality sheet" and the basis weight "257-300 g/m$^2$" in the "reserved setting".

The operation button 83 is a display portion that accepts user operations, and it is composed of control section for operation/display 300 and of closing display 83*b*. The overwrite display 83*a* is an operation portion where the "reserved setting" is copied on "present setting" through operations of a user. The closing display 83*b* is an operation portion where the setting changing screen 80 is made to be non-display. Incidentally, in the example shown in FIG. 7, overwrite display 83*a* is made to be in the state of half-toning, and changes in setting of sheet contents are prohibited. The reason for this is as follows. In the example shown in FIG. 7, the third job is in inability as shown in FIGS. 5 and 6. In addition, the same tray 1 is specified in the first job before the third job. Therefore, if the setting of sheet contents are changed for the third job, execution of the first job is troubled. Therefore, in the example shown in FIG. 7, overwrite display 83*a* is made to be in the state of half-toning, and changes of setting of sheet contents are prohibited.

In this case, in FIGS. 5-7, an example of the occasion, wherein execution of the tray specifying job that specifies a sheet-feeding tray was not possible, was explained. Next, there will be explained an occasion, wherein execution of the automatic job was impossible, referring to FIGS. 8-10.

FIG. 8 is a diagram showing a job inputted. As shown in FIG. 8, let it be assumed that the first job is a tray specifying job that specifies tray 1, "not specified" is for Profile No., "A3" is for Sheet Size, "plain paper" is for Sheet Type, "plain paper" is for Sheet Name, "64-74 g/m$^2$" is for Basis Weight, "white" is for Sheet Color and "none" is for Punched Hole in Sheet.

Further, let it be assumed that the second job is a tray specifying job that specifies tray 3, "not specified" is for Profile No., "SRA3" is for Sheet Size, "plain paper" is for Sheet Type, "plain paper" is for Sheet Name, "64-74 g/m$^2$" is for Basis Weight, "white" is for Sheet Color, and "none" is for Punched Hole in Sheet. Further, let it be assumed that the third job is the automatic job that does not specify a sheet tray, "not specified" is for Profile No., "A3" is for Sheet Size, "fine-quality sheet" is for Sheet Type, "fine-quality sheet" is for Sheet Name, "257-300 g/m$^2$" is for Basis Weight, "white" is for Sheet Color and "none" is for Punched Hole in Sheet. Further, the first job is assumed to specify image forming for 100 sheets P. And the second job is assumed to be for 350 sheets, and the third job is assumed to be for 400 sheets.

Figure 9:
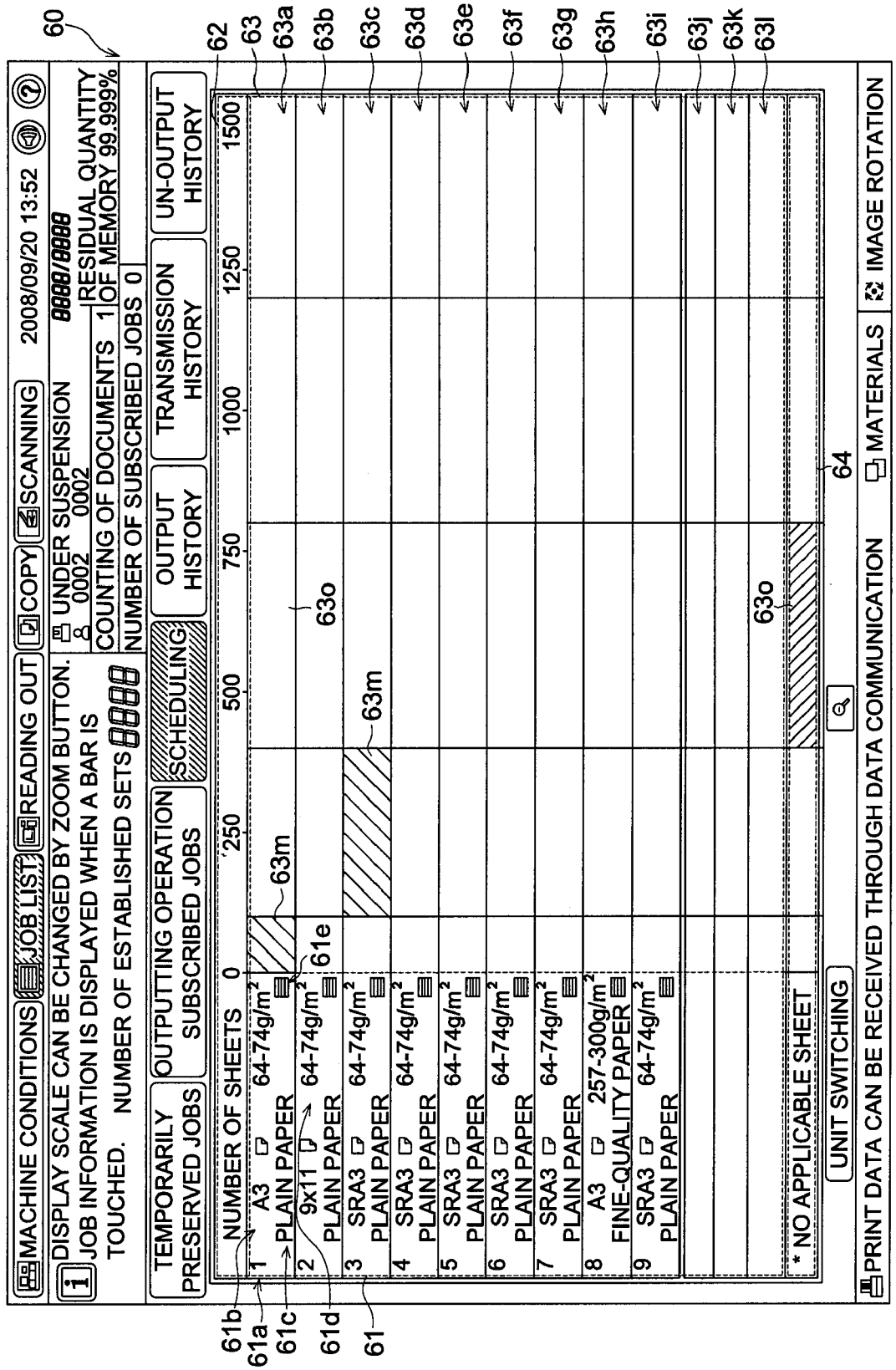
FIG. 9 is a diagram showing setting of sheet contents in each sheet-feeding tray shown in FIG. 5 and showing a schedule image corresponding to a job shown in FIG. 8.

FIG. 9 is a diagram showing schedule image 60 corresponding to setting of sheet contents of each sheet-feeding tray shown in FIG. 5 and to the job shown in FIG. 8. First, in the example shown in FIG. 9, displays of the first and second jobs are the same as those in FIG. 6.

Further, the third job will be as follows. Since the third job is the automatic job that does not specify a sheet-feeding tray, control section 110 judges whether a sheet feeding tray having sheet contents which agree with sheet contents specified by the job exists or not. In this case, in examples shown in FIGS. 8 and 9, tray 8 is a sheet-feeding tray having sheet contents which agree with sheet contents specified by the job. However, there is no single sheet of sheet P is stored in tray 8, which makes it impossible to execute the job. Therefore, the control section for operation/display 300 causes un-execution showing bar 63*o* to be displayed on un-executable job displaying column 64 as explained by referring to FIG. 4. This display makes it possible for a user to know that a sheet-feeding tray is not specified, and to know that the user has only to operate recovery works for any one of plural sheet-feeding trays.

Figure 10:
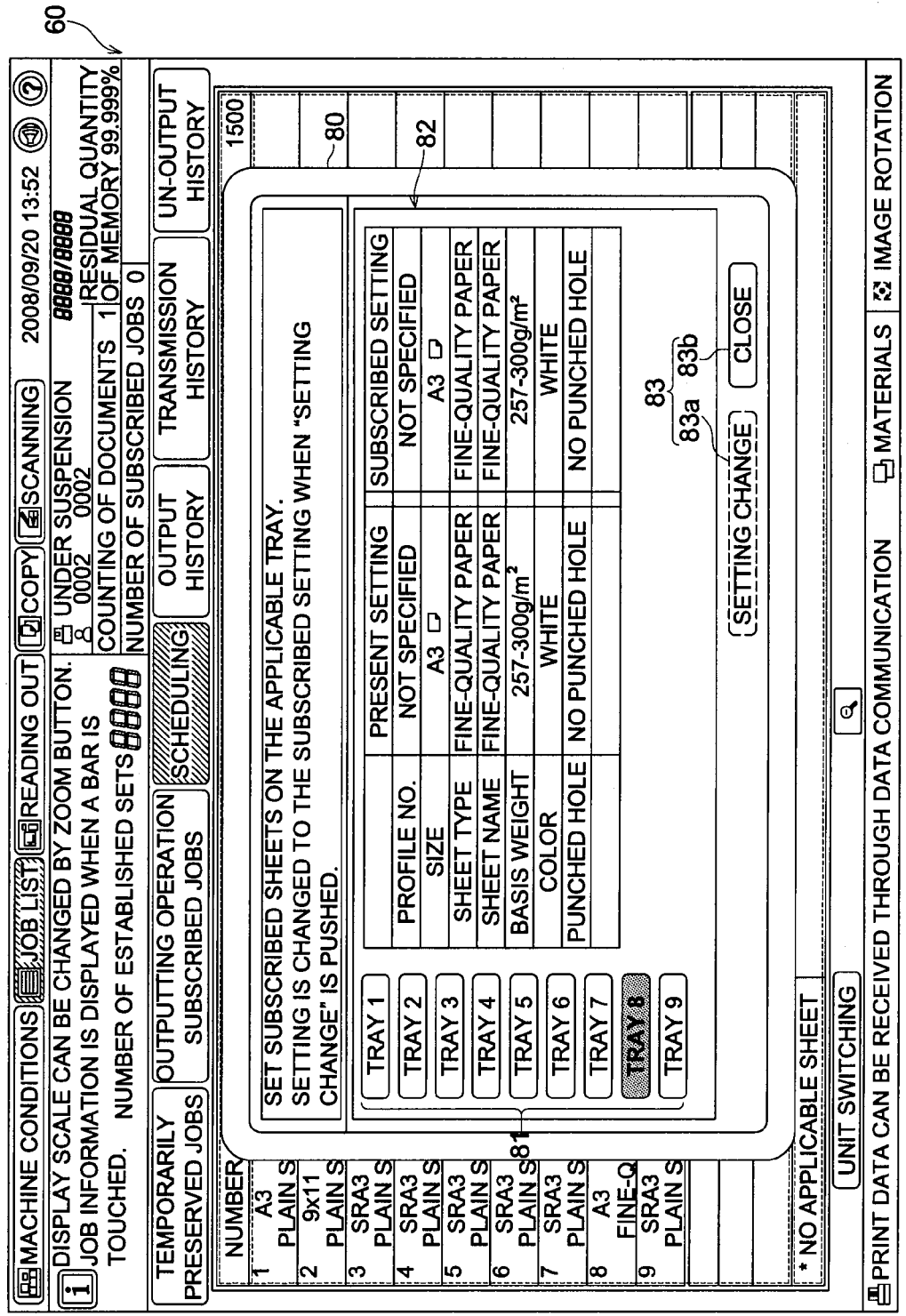
FIG. 10 is a second diagram showing an example of a setting changing screen.

FIG. 10 is a second diagram showing an example of a setting changing screen. As is shown in FIG. 9, when un-execution showing bar 63*o* is displayed, it is possible to cause the setting changing screen 80 shown in FIG. 10 to be displayed by pressing down a display portion of the un-execution showing bar 63*o*.

In the example shown in FIG. 10, changes to all sheet-feeding trays are allowed because the job is the automatic job, as is shown in tray change display column 81. In particular, in the example shown in FIG. 10, tray 1 is specified by the first job and tray 3 is specified by the second job. Therefore, in the case where tray 8 is selected as shown in FIG. 10, executes for the first and second jobs are not troubled even when setting of sheet contents in tray 8 are changed. Therefore, overwrite display 83*a* is not in the state of half-toning, and changes of setting are allowed. Incidentally, when tray 1 or tray 3 is selected on tray change display column 81, the executions of the jobs including the third job and jobs before the third job are troubled. Therefore, for tray 1 and tray 3, the overwrite display 83*a* is made to be in the state of half-toning, and changes of setting are prohibited.

Figure 11:
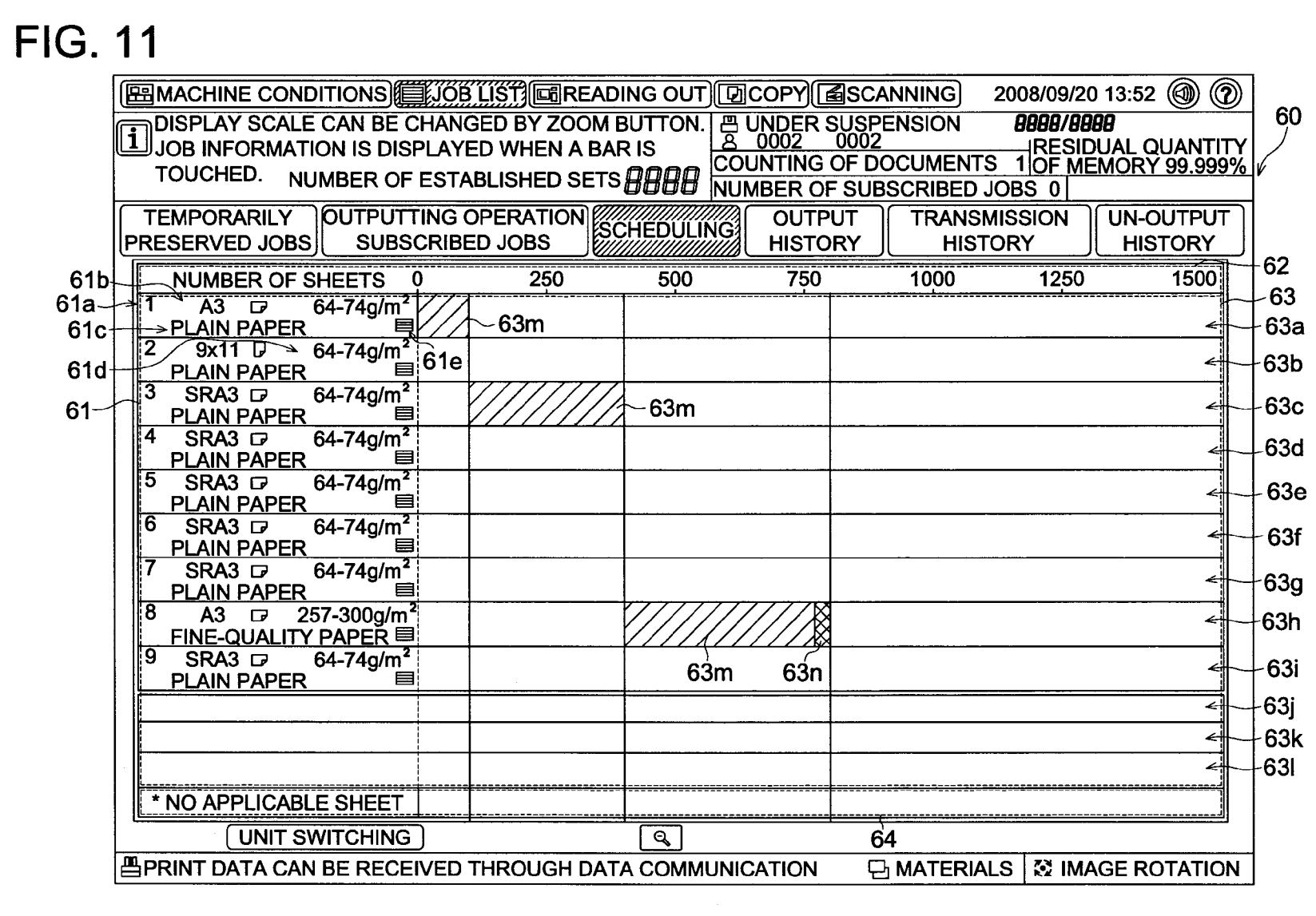

FIG. 11 is a diagram showing schedule image 60 in the case of supplying sheets to tray 8 in the examples shown in FIG. 8 and FIG. 9. As is shown in FIG. 11, when sheet P is replenished in tray 8, the execution of the job is made to be possible. Therefore, printing bar 63*m* is displayed on tray display column 63*h* of tray 8. Further, auxiliary bar 63*n* is displayed from the minimum number of sheets P estimated to be stored in tray 8.

Figure 12:
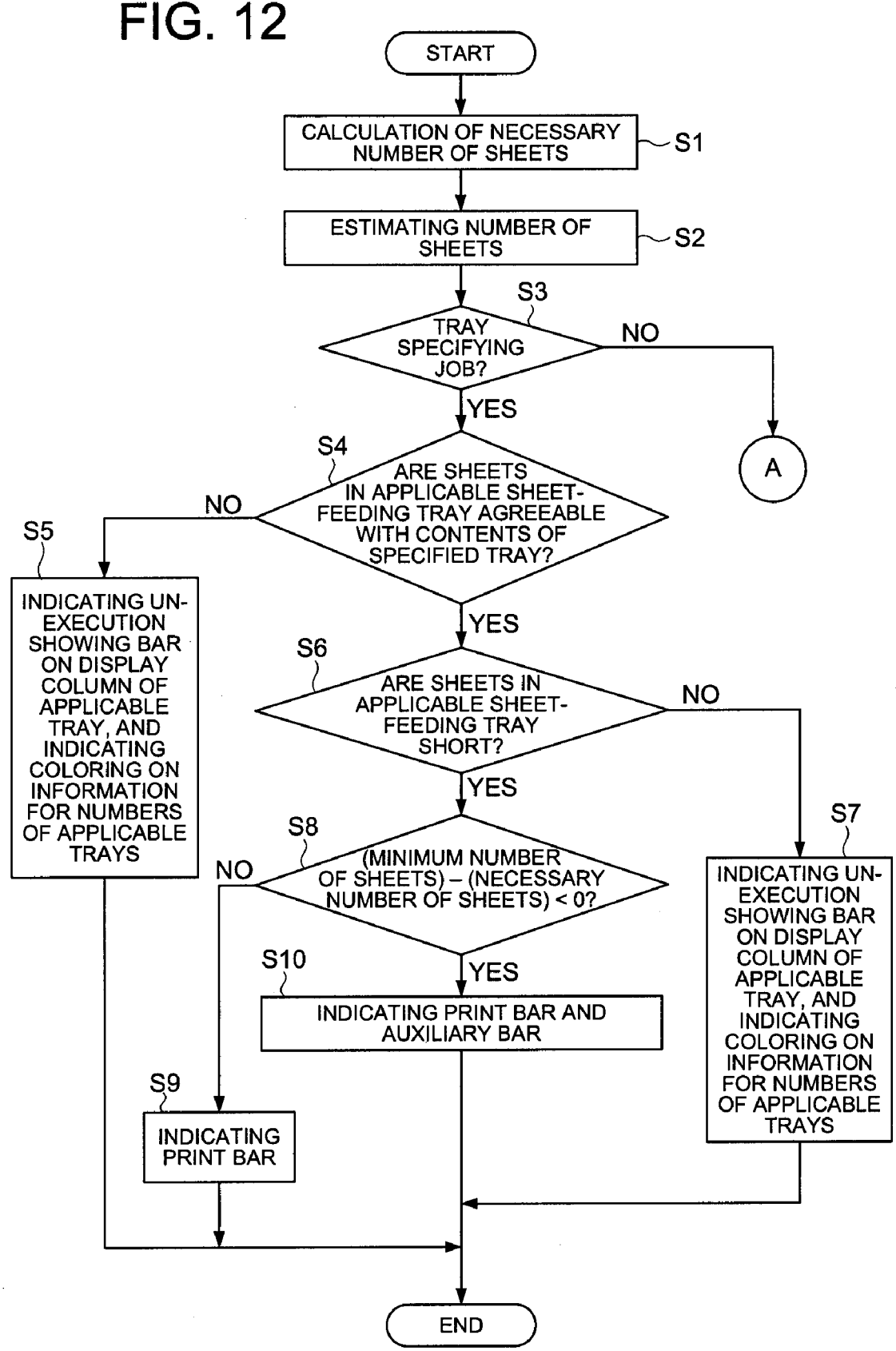
FIG. 12 is a first flow chart showing a display processing of a schedule image of an image forming apparatus relating to the present embodiment.
Figure 13:
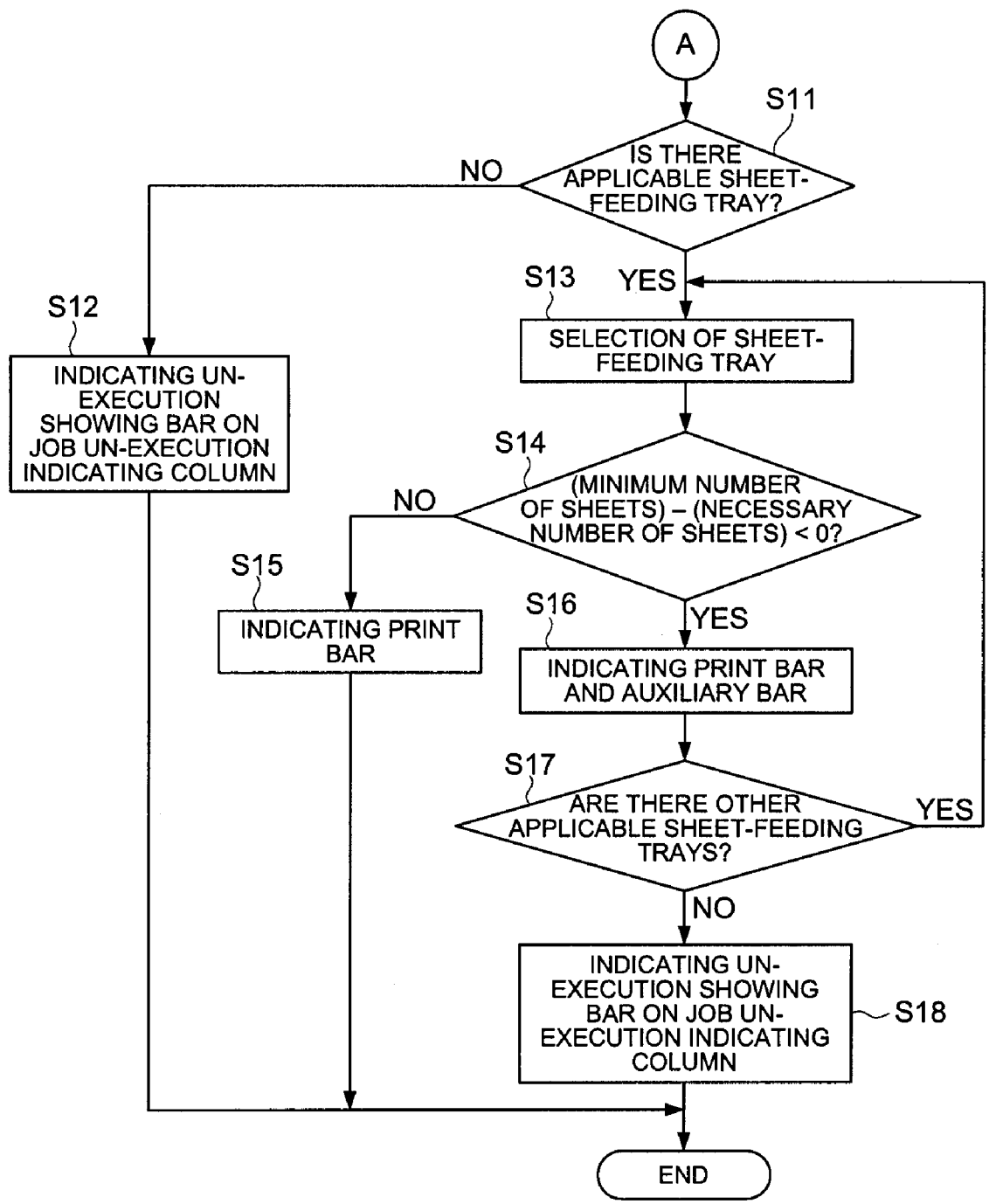
FIG. 13 is a second flow chart showing a display processing of a schedule image of an image forming apparatus relating to the present embodiment.

Next, operations of image forming apparatus 1 relating to the present embodiment will be explained by referring to a flow chart. FIG. 12 is a first flow chart showing a display processing of schedule image 60 of image forming apparatus 1 relating to the present embodiment, and FIG. 13 is a second flow chart showing a display processing of schedule image 60 of image forming apparatus 1 relating to the present embodiment.

As is shown in FIG. 12, when job information is inputted first through printer controller 1*b*, control section 110 calculates the number of sheets needed for the execution of the job by referring to job information (S1). Specifically, the control section 110 calculates the number of sheets needed by the executions of the jobs, based on information of the number of sheets P for print copies included in job information, information of print copies and information indicating whether image forming is for one side or for both sides of a sheet.

Then, print control section 400 estimates the number of sheets P to be stored in each sheet-feeding tray (S2). In this case, the print control section 400 estimates the minimum number of sheets and the maximum number of sheets as explained earlier by referring to FIG. 3.

After that, the control section 110 judges whether the job is a tray specifying job that specifies a sheet-feeding tray or not (S3). When the job is judged to be a tray specifying job (S3: YES), the control section 110 judges whether sheet contents in the applicable sheet-feeding tray specified by a tray specifying job agrees with sheet contents shown by the job (S4).

When the sheet contents in the applicable sheet-feeding tray and the sheet contents shown by the job are judged not to agree with each other (S4: NO), the control section for operation/display 300 causes un-execution showing bar 63*o* to be displayed on tray display columns 63*a*-63*i* of the applicable tray, and it causes coloring display 65 to be displayed on tray number information 61*a* of the applicable tray (S5). After that, processes shown in FIGS. 12 and 13 are terminated.

When the aforesaid sheet contents are judged to agree with each other (S4: YES), the control section 110 judges whether sheets P in the applicable sheet-feeding tray are running short or not (S6). Namely, the control section 110 judges how sheets P are running short, including an occasion wherein sheets P are not stored in the applicable sheet-feeding tray and an occasion wherein sheets P are clearly running short for executions of jobs.

When sheets P in the applicable sheet-feeding tray are judged to be running short (S6: YES), control section for operation/display 300 causes un-execution showing bar 63*o* to be displayed on tray display columns 63*a*-63*i* of applicable tray, and causes coloring display 65 to be displayed on tray number information 61*a* of applicable tray (S7). After that, processes shown in FIG. 12 and FIG. 13 are terminated. On the other hand, when sheets P in applicable sheet-feeding tray are judged not to be running short (S6: NO), control section 110 reduces the number of sheets needed for execution of the job from the minimum number of sheets P estimated in step S2, and judges whether a value of the difference coming from the aforesaid reduction is negative or not (S8).

When a value of the difference coming from the reduction is judged not to be negative (S8: NO), control section for operation/display 300 causes printing bar 63*m* to be displayed on each of tray display columns 63*a*-63*i* of the sheet-feeding tray specified by tray specifying job (S9). After that, processes shown in FIGS. 12 and 13 are terminated.

On the other hand, when a value of the difference coming from the reduction is judged to be negative (S8: YES), control section for operation/display 300 causes printing bar 63*m* to be displayed on each of tray display columns 63*a*-63*i* of sheet-feeding tray specified by the tray specifying job, and causes auxiliary bar 63*n* to be displayed for the portion exceeding the minimum number of sheets (S10). Then, processes shown in FIGS. 12 and 13 are terminated.

Incidentally, when the job is judged not to be the tray specifying job (S3: NO), namely, when the job is an automatic job, control section 110 refers information of sheet contents included in job information, and judges whether there is a sheet-feeding tray that agrees with the sheet contents or not (S11). Incidentally, the sheet-feeding tray agreeing with sheet contents is a tray wherein sheet contents shown by the job agree with sheet contents in the sheet-feeding tray, and at least one sheet P is stored in the sheet-feeding. When the sheet-feeding tray that agrees with sheet contents is judged to be absent (S11: NO), control section for operation/display 300 causes un-execution showing bar 63*o* that shows execution inability of the job to be displayed on un-executable job displaying column 64 (S12). After that, processes shown in FIGS. 12 and 13 are terminated.

On the other hand, when the sheet-feeding tray agreeing with sheet contents is judged to be existent (S11: YES), control section 110 selects one of sheet-feeding trays each agreeing with sheet contents (S13). After that, the control section 110 reduces the number of sheets needed for execution of the job from the minimum number of sheets P estimated in step S2, and judges whether a value of the difference coming from the aforesaid reduction is negative or not (S14).

On the other hand, when a value of the difference coming from the reduction is judged to be negative (S14: YES), control section for operation/display 300 causes printing bar 63*m* to be displayed on each of tray display columns 63*a*-63*i* of sheet-feeding tray selected in step S5 and causes auxiliary bar 63*n* to be displayed for the portion exceeding the minimum number of sheets (S16). Further, the control section 110 refers information of sheet contents included in job information to judge whether there is another sheet-feeding tray agreeing with sheet contents or not (S17).

When another sheet-feeding fray agreeing with sheet contents is judged to be absent (S17: NO), control section for operation/display 300 causes un-execution showing bar 63*o* that shows un-execution of the job to be displayed on un-executable job displaying column 64 (S18) so that it may correspond to the rear end position of printing bar 63*m* displayed in step S9. After that, processes shown in FIGS. 12 and 13 are terminated.

When another sheet-feeding fray agreeing with sheet contents is judged to be existent (S17: YES), a process moves to step S13.

Figure 14:
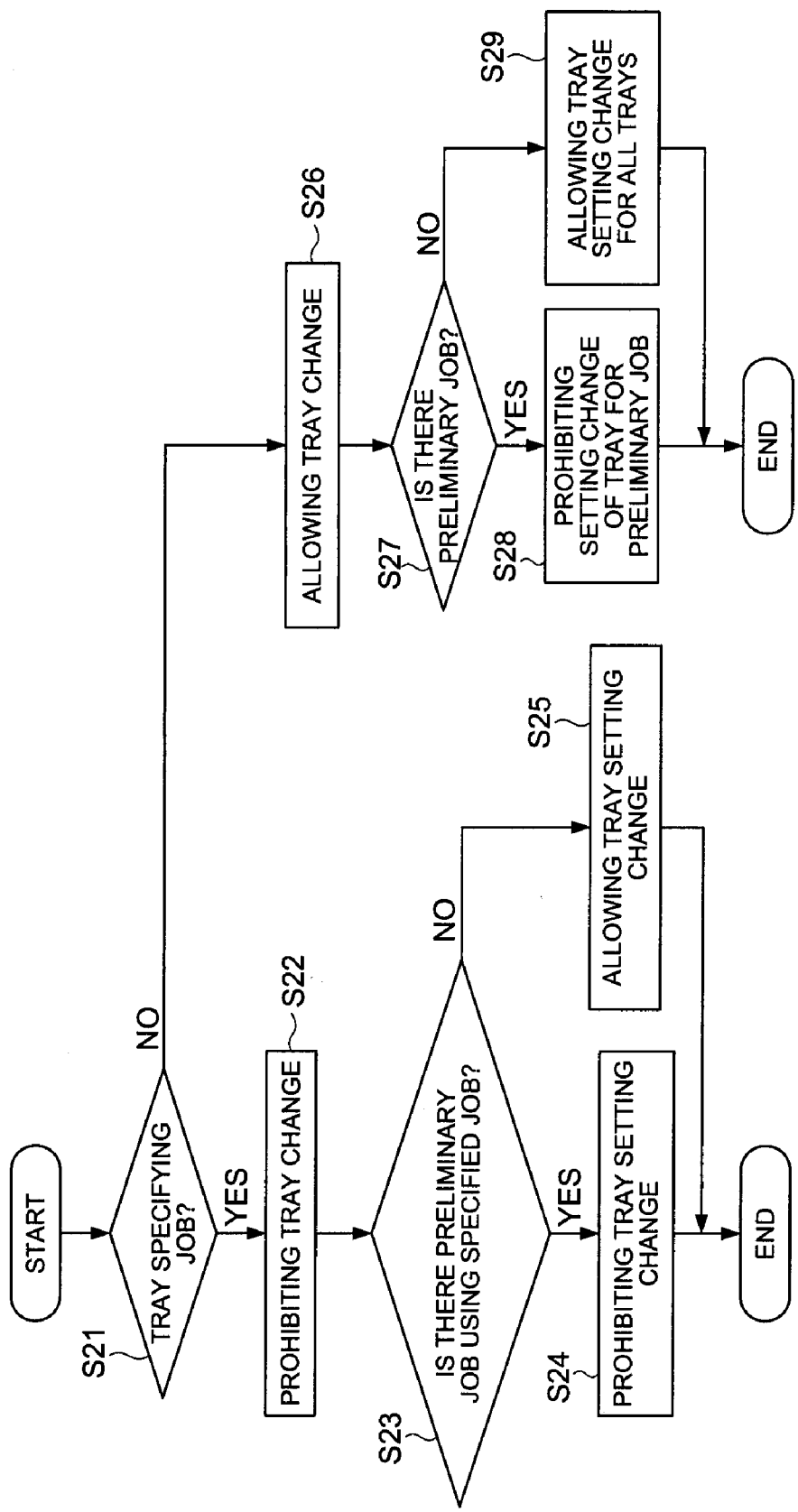
FIG. 14 is a flow chart showing processing in the setting changing screen of an image forming apparatus relating to the present embodiment.

FIG. 14 is a flow chart showing processing in setting changing screen 80 of image forming apparatus 1 relating to the present embodiment. As is mentioned above, when un-execution showing bar 63*o* of schedule image is pressed down, setting changing screen 80 like one shown in FIG. 7 or FIG. 10 is shown. In the case of the display, control section 110 judges whether the job of un-execution showing bar 63*o* depressed is a tray specifying job or not (S21).

When the job is judged to be the fray specifying job (S21: YES), control section 110 prohibits changes of tray to those other than trays specified by the fray specifying job (S22). As a result, control section for operation/display 300 causes sheet-feeding trays, other than those specified by the tray specifying job on tray display column 81, to be in the state of half-toning, and prohibits the selection.

After that, the control section 110 judges whether there is a preliminary job to use a tray specified by a tray specifying job or not (S23). When the preliminary job to use a tray specified by a tray specifying job is judged to be existent (S23: YES), the control section 110 prohibits changes of setting of trays specified by the tray specifying job (S24). As a result, control section for operation/display 300 causes overwrite display 83*a* of operation button 83 to be in the state of half-toning, and prohibits changes of setting. Then, processing shown in FIG. 14 is terminated.

On the other hand, when the preliminary job to use a tray specified by the tray specifying job is judged not to be existent (S23: NO), control section 110 allows setting changes about the tray specified by the tray specifying job (S25). As a result, control section for operation/display 300 does not make overwrite display 83*a* of operation button 83 to be in the state of half-toning, and allows setting changes. Then, processing shown in FIG. 14 is terminated.

When the job is judged not to be a tray specifying job (S21: NO), namely, when the job is an automatic job, control section 110 allows changes of trays (S26). As a result, control section for operation/display 300 does not make all sheet-feeding trays to be in the state of half-toning on the tray change display column 81, and allows selections.

After that, control section 110 judges whether there is a job before the automatic job or not (S27). When a judgment is formed so that a job is existent before the automatic job (S27: YES), the control section 110 prohibits setting changes for trays to be used in the preliminary job (S28). As a result, control section for operation/display 300 makes overwrite display 83*a* of operation button 83 to be in the state of half-toning only for trays to be used in the preliminary job, and prohibits setting changes. Then, processing shown in FIG. 14 is terminated.

On the other hand, when a judgment is formed so that a job is not existent before the automatic job (S27: NO), control section 110 allows setting changes for all sheet-feeding trays, and allows setting changes. Then, processing shown in FIG. 14 is terminated.

In image forming apparatus 1 relating to the present embodiment, when it is impossible to execute the job with the specified sheet-feeding tray, no display is made on un-executable job displaying column 64 in spite of inability of job execution, and inability of job execution is displayed, corresponding to the sheet-feeding tray specified by the job among those on job execution schedule displaying column 63, in the aforesaid way. Therefore, when it is impossible to execute the tray specifying job, the user can understand the specified sheet-feeding tray by displaying that the job cannot be executed, corresponding to the sheet-feeding tray specified by the job, and thereby, the user can conduct recovery work such as replenishment of sheet P and changes of setting for the sheet-feeding tray. This leads to speeding up of recovery work, which improves productivity.

When a job is an automatic job and sheet P having sheet contents specified by the job is not stored in any sheet-feeding tray, these contents are exhibited on un-executable job displaying column 64. With respect to the automatic job wherein execution of a job is possible even when a recovery work is conducted for any sheet-feeding tray, it is possible to broaden the width of selection for users without limiting sheet-feeding tray for recovery, by displaying on un-executable job displaying column 64, which results in an improvement of convenience.

Since the sheet-feeding tray that conducts sheet feeding is changed by responding to input from a user in the course of display of setting changing screen 80, in the case of setting sheet contents of each tray and the execution of the job, a user can change contents of sheets stored in the sheet-feeding tray, which makes it possible to improve convenience.

Further, when a job is a tray specifying job, changes of sheet-feeding tray to those which are other than specified sheet-feeding tray are prohibited. Therefore, when sheets are required to be supplied from the specified sheet-feeding tray like a tray specifying job, it is possible to prevent a situation that a sheet-feeding tray is changed reluctantly, which results in prevention of erroneous printing.

Further, when a job is a tray specifying job, and when a sheet-feeding tray specified by the job before the applicable tray specifying job is used, changes of setting of sheet contents for the specified sheet-feeding tray are prohibited. For this reason, it is possible to prevent situations that setting of sheet contents is changed reluctantly, that setting of the job before the tray specifying job is changed reluctantly and that the execution of the job is troubled.

Further, when a job is an automatic job, changes of setting for sheet contents is allowed for sheet-feeding trays which do not feed sheets under the job that is before the applicable automatic job. Therefore, it is possible to prevent situations that setting of sheet contents is changed reluctantly, setting of the job before the automatic job is changed reluctantly and the execution of the job is troubled.

An image forming apparatus relating to the invention has been explained above, based on the embodiment, to which, however, the invention is not limited, and the disclosed embodiment can be varied by those having ordinary skill in the art without departing from the spirit and scope of the invention.

For example, with respect to setting of sheet contents for each sheet-feeding tray, it is possible to cause an input image to be displayed to be changed when job information is not inputted, without being limited to the occasion wherein changes are made under setting changing screen 80 shown in FIG. 7 and FIG. 10.

Figure 15:
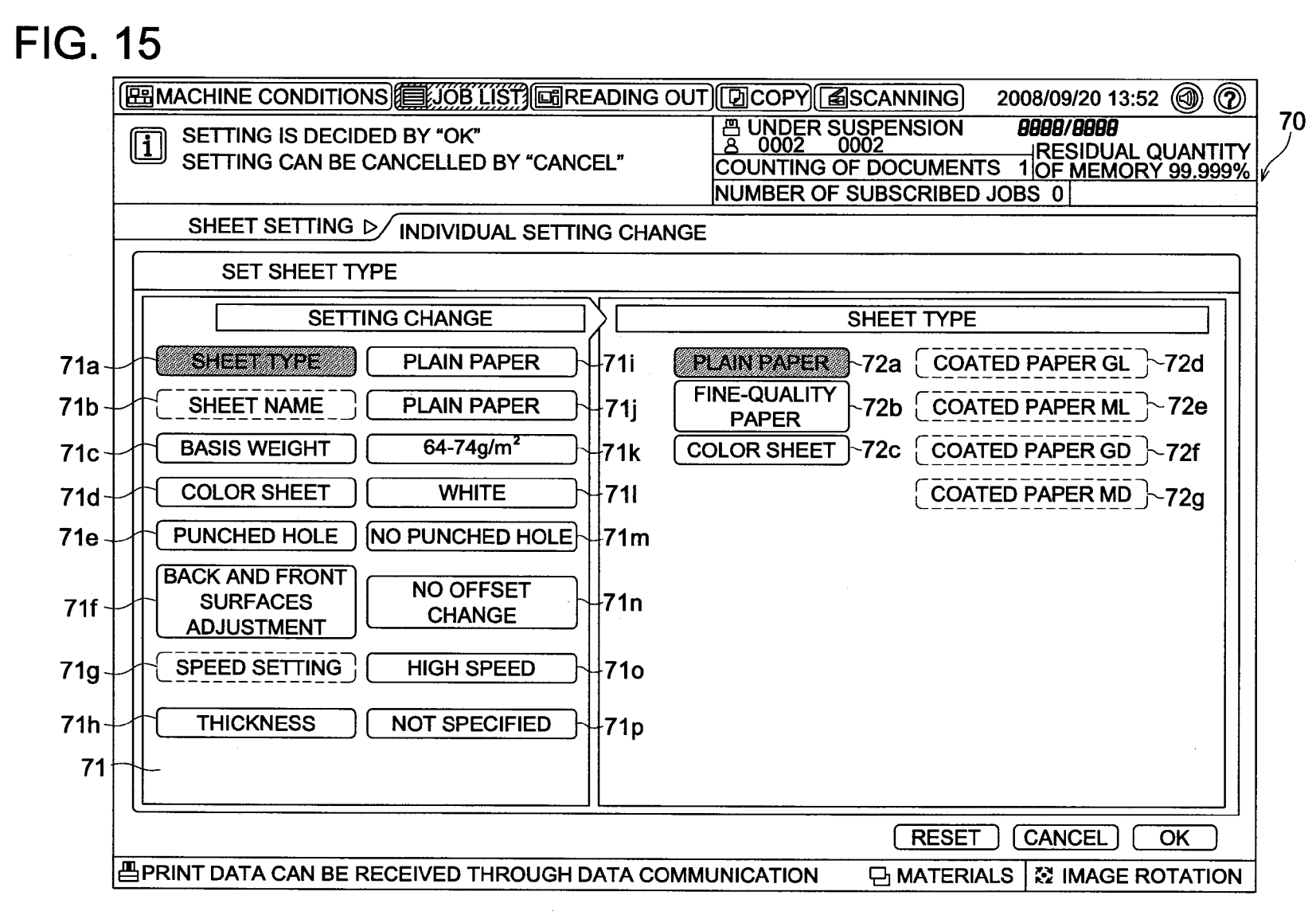

FIG. 15 is a diagram showing an example of input image 70 for inputting information of sheet contents. Incidentally, the input image 70 shown in FIG. 15 is displayed when a user conducts prescribed operations when a user conducts prescribed operations on touch panel 32 or on operation key group 33.

This input image 70 includes setting change image display section 71 and detailed image display section 72. The setting change image display section 71 is a display area that displays respective display sections 71*i*-71*p*. Respective operation buttons 71*a*-71*h* are operation sections for selecting contents to be changes among information of sheet contents. The respective display sections 71*i*-71*p* are display sections for displaying setting of present sheet contents.

Specifically, respective operation buttons 71*a*-71*h* are composed of sheet type setting button 71*a*, sheet name setting button 71*b*, basis weight setting button 71*c*, color sheet button 71d, punched hole setting button 71e, the back and front adjustment setting button 71f, speed setting button 71g, and thickness setting button 71h.

The sheet type setting button 71a is a button for setting plain paper, a fine-quality sheet and a color sheet. Sheet name setting button 71b is a button for inputting a name of sheet P which is desired by a user. Basis weight setting button 71c is a button for setting a basis weight of sheet P. Color sheet button 71d is a button for setting a color of sheet P. Punched hole setting button 71e is a button for inputting a punched hole made on sheet P. Back and front adjustment setting button 71f is a button for adjusting an image forming position on the back and front in the case of two-sided printing. Speed setting button 71g is a button for setting an image forming speed. Thickness setting button 71h is a button for inputting a thickness of sheet P measured by a user.

Respective types of display sections 71i-71p are composed of sheet type display section 71i, sheet name display section 71j, basis weight display section 71k, color sheet display section 71l, punched hole display section 71m, back and front surfaces adjustment display section 71n, speed display section 71o, and thickness display section 71p.

The sheet type display section 71i is a display section that displays a type setting for current sheet P, and it is displaced to be "plain paper" in an example shown in FIG. 15. The sheet name display section 71j is a display section that displays a name setting for current sheet P inputted by a user, and it is displayed to be "plain paper" in an example shown in FIG. 15. The basis weight display section 71k is a display section that displays basis weight setting for current sheet P, and it is discharged to be "64-74 g/m$^2$" in an example shown in FIG. 15. The color sheet display section 71l is a display section that displays color setting for current sheet P, and it is displayed to be "white" in an example shown in FIG. 15. The punched hole display section 71m is a display section that displays punched hole setting for current sheet P, and it is displayed to be "no punched hole" in an example shown in FIG. 15. The back and front adjustment display section 71n is a display section that displays the back and front adjustment setting for current sheet P, and it is displayed to be "offset no change" in an example shown in FIG. 15. The speed display section 71o is a display section that displays image forming speed setting for current sheet P, and it is displayed to be "high speed" in an example shown in FIG. 15. The thickness display section 71p is a display section that displays information of a thickness of current sheet P, and it is displaced to be "not specified" in an example shown in FIG. 15.

Detailed image display section 72 is an area where detailed input buttons 72a-72g representing operation sections for inputting detailed information of sheet contents are displayed. A user can cause detailed input buttons 72a-72g to be displayed on detailed image display section 72 by operating any one of respective types of operation buttons 71a-71h on the left side of the image area. Incidentally, in an example shown in FIG. 15, it is assumed that detailed input buttons 72a-72g which are displayed when sheet type setting button 71a is operated are indicated.

Detailed input buttons 72a-72g, which are displayed when sheet type setting button 71a is operated, are composed of plain paper setting button 72a, fine-quality sheet setting button 72b, color sheet setting button 72c, coating paper GL setting button 72d, coating paper ML setting button 72e, coating paper GO setting button 72f and coating paper ML setting button 72g.

Plain paper setting button 72a is a button for setting a sheet type to be plain paper. Fine-quality sheet setting button 72b is a button for setting a sheet type to be a fine-quality sheet. Color sheet setting button 72c is a button for setting a sheet type to be a color sheet. Coating paper GL setting button 72d is a button for setting a sheet type to be a coating paper GL. Coating paper ML setting button 72e is a button for setting a sheet type to be a coating paper ML. Coating paper GO setting button 72f is a button for setting a sheet type to be a coating paper GO. Coating paper ML setting button 72g is a button for setting a sheet type to be a coating paper ML.

A user can change information of sheet contents by operating any one of respective operation buttons 71a-71h displayed on setting change image display section 71, and by operating detailed input buttons 72a-72g which are displayed on detailed image display section 72 by the foregoing operation. In particular, when setting of sheet contents are changed by operating sheet type setting button 71a and by operating basis weight setting button 71, the aforesaid amount of correction is changed. For example, when plain paper and basis weight of 64-74 g/m$^2$ are established, an amount of correction is +30%. However, when the aforesaid setting is changed to a color sheet and to basis weight of 81-105 g/m$^2$, the amount of correction is changed to +5%. Further, when the thickness information that is resulted from operation of thickness setting button 71h is inputted, an amount of correction based on thickness information is also considered, and the number of sheets is corrected.

Incidentally, with respect to sheet name setting button 71b, speed setting button 71f, coating paper GL setting button 72d, coating paper ML setting button 72e, coating paper GO setting button 72t and coating paper ML setting button 72g, all of which are shown in FIG. 15, it is impossible to operate from the current setting of image forming apparatus 1, whereby the half-toning state is kept. Further, in the example shown in FIG. 15, detailed input buttons 72a-72g which are displayed when sheet type setting button 71a is operated are indicated, but when other setting buttons 71b-71h are operated, other detailed input button is displayed on the detailed image display section 72.

When a job is a tray specifying job, control section 110 prohibits changes of sheet-feeding tray to those other than specified sheet-feeding trays, in the present embodiment. However, the control section 110 may allow the changes without being limited to the foregoing. Because it is possible to make changes of sheet-feeding trays to be capable and to control deterioration of productivity, in the occasion where the productivity is lowered if changes of sheet-feeding trays are prohibited totally, such as an occasion where recovery works in the specified sheet-feeding trays are extremely difficult.

Incidentally, in this case, it is preferable for control section 110 to prohibit changes of setting for sheet contents for sheet-feeding trays which are used in the job preceding the applicable tray specifying job among sheet-feeding trays other than the specified sheet-feeding trays. The reason for the foregoing is that it is possible to prevent the situations where the jobs preceding the previous jobs are troubled, even when the job is the tray specifying job and even when changes of sheet-feeding trays to those other than the specified sheet-feeding trays are allowed.

Further, though the image forming apparatus is a digital multifunctional peripheral in the present embodiment, it may also be another image forming apparatus such as a printer, without being limited to the digital multifunctional peripheral.

In addition, schedule image 60 is not limited to those shown in FIG. 4 in the present embodiment, and it is not limited to the display form, in particular, if it shows a schedule for practicing jobs.

What is claimed is:

1. An image forming apparatus comprising:
   plural sheet-feeding trays; and
   a control section that is configured to display a schedule image to show an execution schedule of a job on a display section,
   wherein the control section is capable of displaying a job execution schedule displaying column to show the execution schedule of the job, and an un-executable job displaying column to show that the job is un-executable, both columns being included in the schedule image,
   wherein when a job represents a tray specifying job that specifies a sheet-feeding tray to be used among the plural sheet-feeding trays, and if the job is un-executable using the sheet-feeding tray specified by the tray specifying job,
   the control section controls the un-executable job displaying column, not to display that the specified job is un-executable, even though the job is un-executable, and
   the control section further controls the job execution schedule displaying column to show that the job is not executable, while corresponding the job with the sheet-feeding fray specified by the job.

2. The image forming apparatus of claim 1,
   wherein when the job represents an automatic job to select a sheet-feeding tray which accommodates the sheets, having sheet contents equal to sheet contents specified by the job, among the plural sheet-feeding trays, and simultaneously when there is no sheet-feeding tray accommodating sheets having the sheet contents equal to the sheet contents specified by the job, the control section controls the un-executable job displaying column to display that the job is not executable.

3. The image forming apparatus of claim 2, the control section displays a setting changing screen, on which a setting of the sheet contents of sheets accommodated in each sheet-feeding tray is changed, and on which the sheet-feeding fray for supplying the sheets for executing the job is changed, whereby the control section changes the setting of the sheet contents of sheets accommodated in each sheet-feeding tray, and changes the sheet-feeding fray which supplies the setting of the sheets for executing the job, based on instructions offered by an operator, while the setting changing screen is displayed.

4. The image forming apparatus of claim 3, wherein when the job represents the tray specifying job, the control section prevents the sheet-feeding tray to be changed to another sheet-feeding tray, other than the specified sheet-feeding tray.

5. The image forming apparatus of claim 3, wherein when the job represents the tray specifying job, and when the sheet-feeding tray, which has been specified by a job, being specified formerly of the present tray specifying job, is used, the control section prevents the change of settings of the sheet contents of the specified sheet-feeding tray.

6. The image forming apparatus of claim 3, wherein when the job represents the automatic job, the control section prevents the change of settings of the sheet contents, for the sheet-feeding tray which supplies the sheet by the job, being specified formerly of the automatic job.

7. The image forming apparatus of claim 3, wherein when the job represents the tray specifying job, the control section allows the sheet-feeding tray to be changed to a sheet-feeding tray, which is other than the specified sheet-feeding tray.

8. The image forming apparatus of claim 7, wherein when the job represents the tray specifying job, the control section prevents the change of settings of the sheet contents, for the sheet-feeding tray to be used in the job, being specified formerly of the tray specifying job, among the sheet-feeding trays, other than the specified sheet-feeding tray.

9. A method of displaying a schedule image showing an execution schedule of a job of an image forming apparatus having plural sheet-feeding trays, comprising the steps of:
   displaying a job execution schedule displaying column to show an execution schedule of a job, and displaying an un-executable job displaying column to show that the job is un-executable, both columns being included in the schedule image, and
   without displaying that the specified job is un-executable on the un-executable job displaying column even though the job is un-executable, displaying that the job is not executable on the job execution schedule displaying column, while making the job to correspond with the sheet-feeding tray specified by the job, in a case that a job represents a tray specifying job that specifies a sheet-feeding tray to be used among the plural sheet-feeding trays, and that the job is un-executable using the sheet-feeding tray specified by the tray specifying job.

10. The method of claim 9, further comprising the step of:
    displaying that the job is not executable on the un-executable job displaying column, in a case that the job represents an automatic job to select a sheet-feeding tray which accommodates the sheets, having sheet contents equal to sheet contents specified by the job, among the plural sheet-feeding trays, and that there is no sheet-feeding tray accommodating a sheet having the sheet contents equal to the sheet contents specified by the job.

11. The method of claim 10, further comprising the steps of displaying a settings changing screen, on which a setting of the sheet contents of sheets accommodated in each sheet-feeding tray is changed, and on which the sheet-feeding tray for supplying the sheets for executing the job is changed; and
    changing the setting of the sheet contents of sheets accommodated in each sheet-feeding tray and the sheet-feeding tray which supplies the sheets for executing the job, based on instructions offered by the operator, while the setting changing screen is displayed.

12. The method of claim 11, further comprising the step of preventing the sheet-feeding tray to be changed to another sheet-feeding tray, other than the specified sheet-feeding tray, in a case that the job represents the tray specifying job.

13. The method of claim 11, further comprising the step of:
    preventing the change of settings of the sheet contents of the specified sheet-feeding tray,
    in the case that the job represents the tray specifying job, and that the sheet-feeding tray, which has been specified by a job being formerly of the present tray specifying job, is used.

14. The method of claim 11, further comprising the step of preventing the change of setting of the sheet contents, for the sheet-feeding tray which supplies the sheet by the job, being specified formerly of the automatic job, in the case that the job represents the automatic job.

15. The method of claim 11, further comprising the step of:
    allowing the sheet-feeding tray to be changed to a sheet-feeding tray, which is other than the specified sheet-feeding tray, in the case that the job represents the tray specifying job.

16. The method of claim 15, further comprising the step of:
    preventing the change of setting of the sheet contents, for the sheet-feeding tray to be used in the job, being formerly of the tray specifying job, among the sheet-feeding trays, other than the specified sheet-feeding tray, in the case that the job represents the tray specifying job.

* * * * *